United States Patent
Takahashi et al.

(10) Patent No.: US 7,222,008 B2
(45) Date of Patent: May 22, 2007

(54) VEHICLE STEERING CONTROL APPARATUS

(75) Inventors: Toshihiro Takahashi, Nishio (JP); Shoji Ogawa, Chiryu (JP); Hiroshi Kuroyanagi, Nagoya (JP); Shoji Asai, Nagoya (JP)

(73) Assignee: JTEKT Corporation, Osaka (JP)

( * ) Notice: Subject to any disclaimer, the term of this patent is extended or adjusted under 35 U.S.C. 154(b) by 318 days.

(21) Appl. No.: 10/724,997

(22) Filed: Dec. 2, 2003

(65) Prior Publication Data
US 2004/0128042 A1 Jul. 1, 2004

(30) Foreign Application Priority Data
Dec. 2, 2002 (JP) ............... 2002-349893

(51) Int. Cl.
*B62D 6/00* (2006.01)
(52) U.S. Cl. ............... 701/41; 701/42; 180/443
(58) Field of Classification Search ......... 701/41, 701/42, 43; 180/443
See application file for complete search history.

(56) References Cited

U.S. PATENT DOCUMENTS

| | | | |
|---|---|---|---|
| 5,670,856 A | * | 9/1997 | Le et al. ............ 318/564 |
| 6,208,923 B1 | | 3/2001 | Hommel |
| 6,820,715 B2 | * | 11/2004 | Laurent et al. ......... 180/443 |
| 6,929,090 B2 | * | 8/2005 | Furumi et al. ......... 180/446 |
| 2004/0007416 A1 | * | 1/2004 | Furumi et al. ......... 180/443 |
| 2004/0040778 A1 | * | 3/2004 | Katou et al. ......... 180/402 |

FOREIGN PATENT DOCUMENTS

| | | |
|---|---|---|
| DE | 199 46 073 A1 | 5/2001 |
| EP | 1 314 628 | 5/2003 |
| JP | 10-218000 | 8/1998 |
| JP | 2002-37112 | 2/2002 |

* cited by examiner

*Primary Examiner*—Thomas Black
*Assistant Examiner*—Marie A Weiskopf
(74) *Attorney, Agent, or Firm*—Oblon, Spivak, McClelland, Maier & Neustadt, P.C.

(57) ABSTRACT

The present invention relates to a steering control apparatus for maintaining operating characteristics which do not change from when conditions are normal and when an impairment occurs. The apparatus includes a plurality of motors for driving a steered wheel and a plurality of ECUs, each associated with one of the motors. When the steering control apparatus is operating normally, a torque command representing torque required to turn the steered wheel is generated. The torque command is divided in accordance with the number of motors. Each of the ECUs control the associated motors in accordance with a corresponding one of the distributed torques.

15 Claims, 17 Drawing Sheets

Fig.11

(Impairment Control Mode)

(Impaired)

- 14 — 1st Steering Angle Sensor
- 15 — 2nd Steering Angle Sensor
- 36 — 1st Motor
- 52 — 1st Rotation Angle Sensor
- 37 — 2nd Motor
- 53 — 2nd Rotation Angle Sensor
- 22 — (SY2)
- 22A — Position Control
- 22C — Current Control
- 22D — Speed Control
- 22E — Differential
- 57, 71, 72

Signals: Position Command, Speed Command C2, Torque Command ΔP13, Current FB, Position FB

SY1

VEHICLE STEERING CONTROL APPARATUS

CROSS-REFERENCE TO RELATED APPLICATIONS

This application is based upon and claims the benefit of priority from prior Japanese Patent Application No. 2002-349893, filed on Dec. 2, 2002, the entire contents of which are incorporated herein by reference.

BACKGROUND OF THE INVENTION

The present invention relates to a vehicle steering control apparatus, and more particularly, to a steer-by-wire type steering control apparatus.

A first control apparatus used for steer-by-wire power steering is known in the prior art. In a vehicle that employs steer-by-wire power steering, the steering wheel is not mechanically connected to a steering wheel box, which is connected to the front wheels (steered wheels). The steer-by-wire type steering control apparatus drives the electric motor of the steering gear box in accordance with the steering angle of the steering wheel.

This conventional steering control apparatus has a backup system so as to continue steering operation even when a breakdown occurs. Japanese Laid-Open Patent Publication No. 2002-37112 discloses a first prior art steering control apparatus provided with two control systems. One of the two control systems is a primary control system, and the other control system is a secondary control system. That is, the backup system of the first prior art steering control apparatus is formed by a redundant control system.

The primary control system includes a primary electric motor for driving a steering rod coupled to the steered wheels, a primary drive circuit for driving the primary motor, a primary control circuit for supplying control signals for driving the primary electric motor to the primary drive circuit, and various types of sensors. The structure of the secondary control system is identical to that of the primary control system. When both control systems are operating normally, the primary control system and the secondary control system operate the primary motor and the secondary motor to drive the steering rods in accordance with the steering angle of the steering wheel to avoid mutual interference between the primary motor and the secondary motor.

When the primary control system is impaired, the primary control circuit stops the primary electric motor, and the secondary control circuit drives the steering rod by means of the secondary steering motor.

Japanese Laid-Open Patent Publication No. 10-218000 (corresponding to U.S. Pat. No. 6,523,637) discloses a second conventional steering control apparatus for driving two steering motors. The control unit of this steering control apparatus distributes the drive forces of the two steering motors at a predetermined ratio.

The first and second conventional art steering control apparatuses control electric motors based on a detection value from a steering angle sensor for detecting the steering angle of a steering wheel. Thus, the torques of the two steering motors produce mutual interference.

Although the rotation angles of the output shafts of the electric motors detected by a rotation angle sensor provided to each electric motor is used for feedback control, the output shafts of the two electric motors are controlled at mutually different positions by the feedback control due to electric motor assembly errors and rotation angle sensor assembly errors. Therefore, the drive torque directions of the two steering motors are mismatched, and the synthesized torque is insufficient. Furthermore, noise and vibration are generated, and the electric motors are heated.

In the first conventional prior art apparatus, a detection mechanism is provided for detecting mutual torque interference of the steering motors of both control systems. When the mutual interference detection mechanism detects mutual interference, the operation of one of the control systems (including the operation of the electric motor) is stopped.

However, when mutual torque interference occurs, one control system is stopped and the steering rod coupled to the steered wheels are driven by the electric motor of the other control system, even though both control systems were operating normally. Therefore, this method is undesirable when both control systems are operating normally.

In the second conventional prior art apparatus, a primary steering motor and a secondary steering motor having mutually different configurations and performance are disposed at different locations. Since the performance (characteristics) of the two steering motors are mutually different, there is limited freedom for torque distribution to the two steering motors. Furthermore, a difference occurs in the steering operation sensitivity before and after impairment occurs regardless of which motor is impaired.

SUMMARY OF THE INVENTION

It is an object of the present invention to provide a vehicle steering control apparatus capable of suppressing the generation of heat, vibration, noise, and torque interference between a plurality of electric motors without decreasing motor torque.

Another object of the present invention is to provide a steering control apparatus that prevents a reduction in vehicle steering sensitivity when an impairment is occur in the apparatus.

To achieve the above objects, the present invention provides a steering control apparatus which has a steered wheel drive mechanism including a plurality of motors for driving a steered wheel. The plurality of motors are arranged coaxially, have substantially the same performance, and are driven simultaneously. The steered wheel drive mechanism also has a plurality of control means, each controlling an associated one of the motors. A plurality of systems are configured by the plurality of motors and the plurality of control means. The control means of one of the systems generates a first torque command representing torque for turning the steered wheel based on the steering position of a steering wheel and position information of the motor associated with the one of the systems. Further, the control means of one of the systems distributes the first torque command in accordance with the number of the systems to generate one or more divided torque commands. Each of the one or more divided torque commands is providing to an associated one of the systems. The control means of one of the systems also controls the torque of the associated one of the motors in accordance with the distributed torque command distributed to the one of the systems. The control means of at least a further one of the systems controls the torque of the associated one of the motors in accordance with the distributed torque command distributed to the at least one other system.

Other aspects and advantages of the present invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which:

FIG. 11 illustrates the operation of the steering control apparatus of FIG. 10 in the impairment control mode;

DETAILED DESCRIPTION OF THE PREFERRED EMBODIMENTS

A steer-by-wire type steering control apparatus 1 according to a first embodiment of the present invention will now be discussed.

Figure 1:
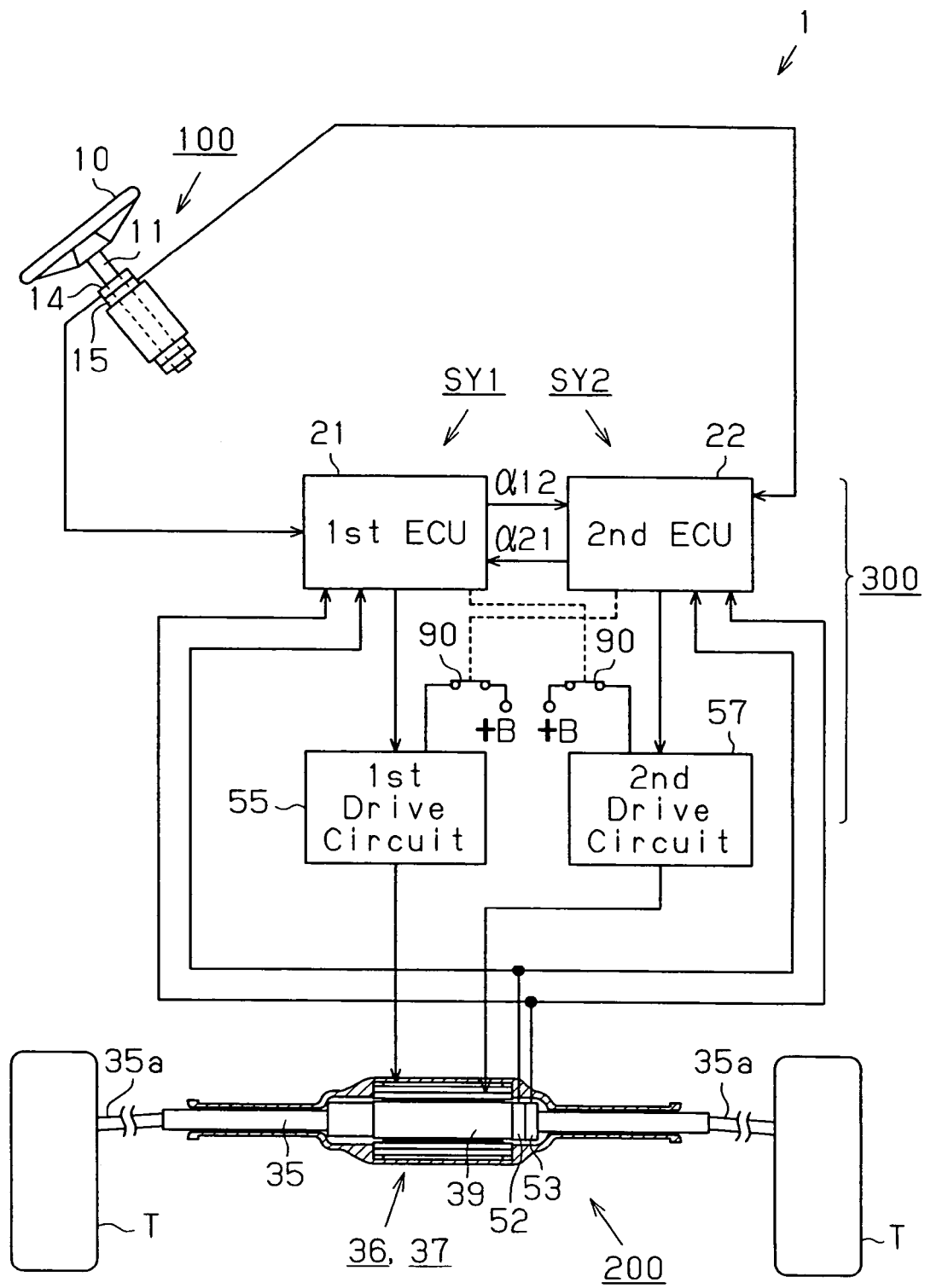
FIG. 1 is a schematic diagram showing a steering control apparatus according to a first embodiment of the present invention.

As shown in FIG. 1, the steering control apparatus 1 of the first embodiment is provided with an operating mechanism 100 including a steering wheel 10, a steered wheel drive mechanism 200, and a control unit 300.

The operating mechanism 100 includes a steering shaft 11 supported so as to be rotatable relative to the vehicle (not shown), and a steering wheel 10 coupled to the steering shaft 11.

A first steering angle sensor 14 and a second steering angle sensor 15 for detecting the rotation angle of the steering shaft 11, or the operating position of the steering wheel 10, are provided on the steering shaft 11.

The first steering angle sensor 14 is connected to a first control unit (ECU) 21 of a first system SY1. The second steering angle sensor 15 is connected to a second ECU 22 of a second system SY2.

Figure 2:
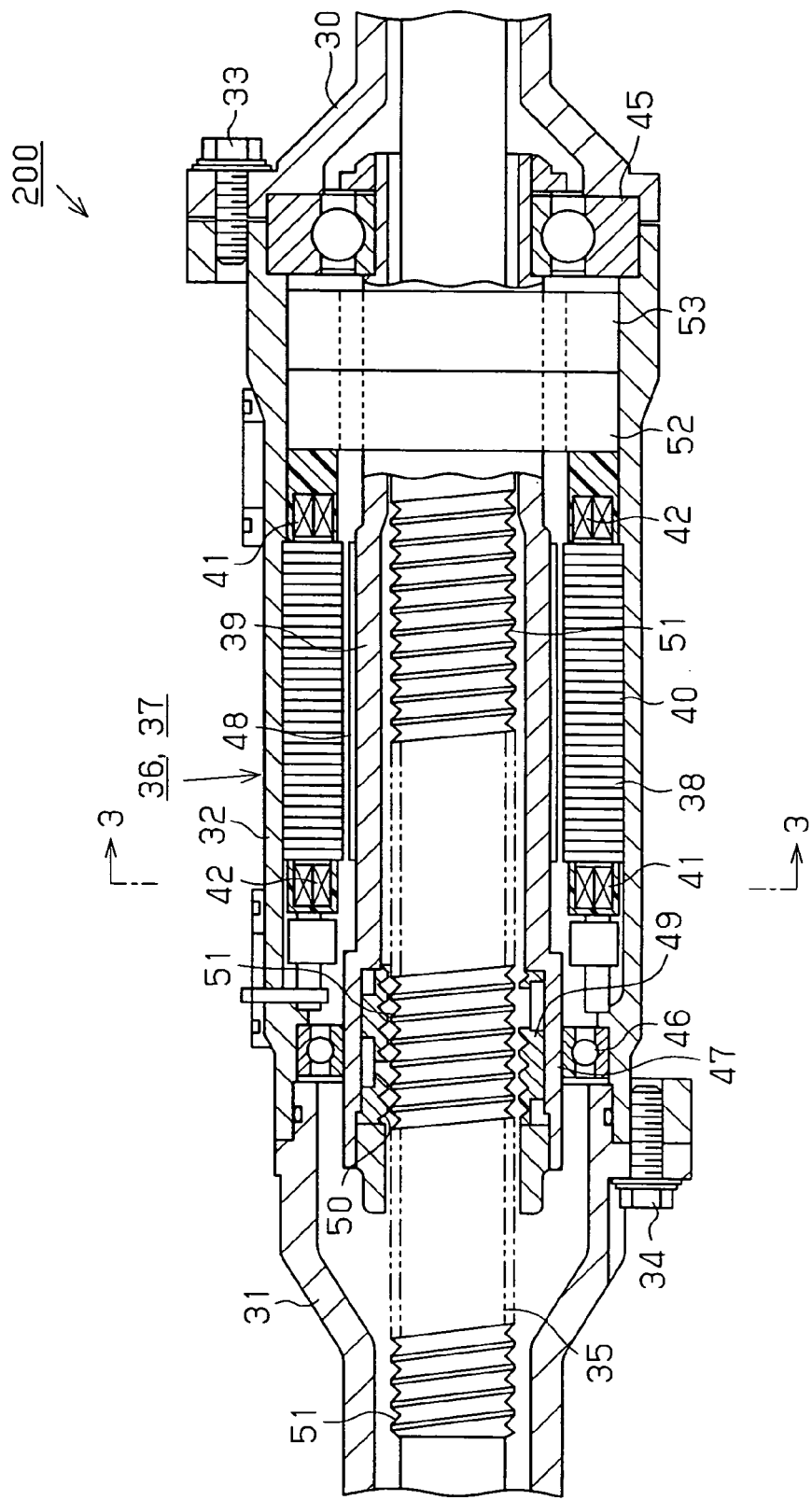
FIG. 2 is an enlarged view showing a steered wheel drive mechanism.

The steered wheel drive mechanism 200 is described below with reference to FIG. 2.

The steered wheel drive mechanism 200 includes a first steering rod housing 30, second steering rod housing 31, and motor housing 32. The three housings 30, 31, and 32 are tube-like housings connected by bolts 33 and 34 so as to have the same axis. The tube-like housing is attached to a vehicle body (not shown).

A steering rod 35 is accommodated within the tube-like housing so as to be non-rotatable but movable in the longitudinal direction. The two ends of the steering rod 35 are each mechanically connected to the left and right front tires T (steered wheels) by a tie rod 35a (FIG. 1).

Two electric motors (steering motors) 36 and 37 are accommodated within the motor housing 32. The first motor 36 and the second motor 37 are desirably three-phase synchronous-type brushless DC motors.

The first motor 36 and the second motor 37 share a common stator 38 and a rotor, or motor shaft 39. Accordingly, the first and second motors 36 and 37 are arranged coaxially.

Figure 3:
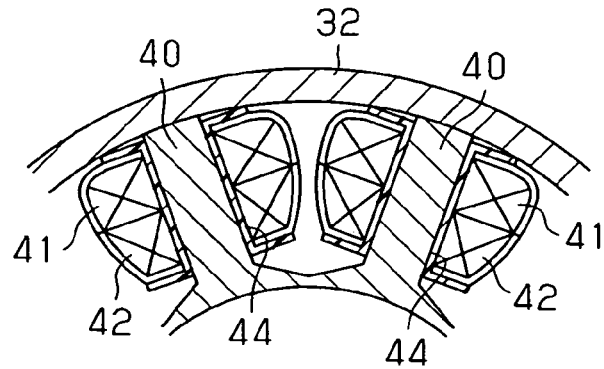
FIG. 3 is a cross sectional view taken along line 3—3 in FIG. 2.

The stator 38 includes a plurality of salient poles 40 (FIG. 3) which fit into the interior surface of the motor housing 32, and the plurality of salient poles 40 are provided at equiangular intervals. In the present embodiment, twelve salient poles 40 are provided. Mounted on each salient pole 40 is an insulating bobbin 44 on which is wound a first motor coil 41 corresponding to the first motor 36 and a second motor coil 42 corresponding to the second motor 37. The first motor coil 41 is arranged closer to the motor housing 32, and the second motor coil 42 is arranged closer to the motor shaft 39.

The first motor coil 41 and the second motor coil 42 are integrated by an insulating resin layer formed by molding. The first motor coil 41 and the second motor coil 42 of each salient pole 40 are wound such that each salient pole 40 has the same phase and polarity. The supply of excitation current to the first motor coil 41 and the second motor coil 42 is respectively controlled by a first drive circuit 55 and a second drive circuit 57.

For example, a second motor coil 42 having a U-phase is wound on a salient pole 40, on which a first motor coil 41 having a U-phase is wound. A second motor coil 42 having a V-phase is wound on a salient pole 40, on which a first motor coil 41 having a V-phase is wound. A second motor coil 42 having a W-phase is wound on a salient pole 40, on which a first motor coil 41 having a W-phase is wound. Similarly, a plurality of second motor coils 42, which respectively have a /U-phase, a /V-phase, and a /W-phase, are wound on a plurality of salient poles 40 provided with a plurality of first motor coils 41, respectively having /U-phase, /V-phase, and /W-phase. The phases with the attached forward slash symbol "/" and the phases without the slash symbol "/" indicate that the coil directions are opposite so as to produce salient poles 40 of opposite polarity. In the following description, coils which have a U-phase and /U-phase are simply referred to as U-phase coils. V-phase and W-phase coils are treated similarly.

The coils on each salient pole 40 are arranged in the motor rotation direction in the sequence: U1, /U1, V1, /V1, W1, /W1, U2, /U2, V2, /V2, W2, /W2. U1 and U2 are U-phases which have mutually identical polarities, and /U1 and /U2 are U-phases which have mutually identical polarities. V and W are similar.

The outputs of the first motor 36 and the second motor 37 are mutually identical. Since the outputs of both motors 36 and 37 are equal, the same number of first motor coils 41 and second motor coils 42 are provided on each salient pole 40, that is, excitation currents of identical magnitude are supplied to the first motor coils 41 and the second motor coils 42 of each salient pole 40. Accordingly, when both motors 36 and 37 are operating simultaneously, their synthesized output torque is double the output torque of the individual motors.

The motor shaft 39 is a hollow tube, arranged on the exterior side of the steering rod 35 in the middle part in the longitudinal direction of the steering rod 35. One end of the motor shaft 39 (the end on the right side in FIG. 2) is supported by the motor housing 32 and the first steering rod housing 30 via a first bearing 45. A hollow cylinder-like nut retainer 47 is formed on the other end of the motor shaft 39 (the end on the left side in FIG. 2). The diameter of the nut retainer 47 is larger than the diameter of the middle part of the motor shaft 39. The nut retainer 47 is supported by the motor housing 32 and the second steering rod housing 31 via a second bearing 46.

Accordingly, the motor shaft 39 is supported by the first and second bearing 45 and 46 so as to be rotatable relative to the first and second steering rod housings 30 and 31 and the motor housing 32.

A permanent magnet 48 is attached at a position opposite the stator 38 on the exterior surface of the motor shaft 39. When an excitation current is supplied to at least one of the first motor coil 41 and the second motor coil 42, the motor shaft 39 is rotated by the mutual action of the stator 38 and the permanent magnet 48.

A ball screw nut 49 is attached coaxially to the motor shaft 39 on the interior surface of the nut retainer 47. The ball screw nut 49 has a ball screw channel 50 formed on its interior surface.

The steering rod 35 has a ball screw channel 51 formed in a predetermined range in the longitudinal direction on its exterior surface. A plurality of balls (not shown) are accommodated between the ball screw channel 51 of the steering rod 35 and the ball screw channel 50 of the ball screw nut 49. A ball screw mechanism is formed by the ball screw nut 49 and the ball screw channel 51 of the steering rod 35. The ball screw mechanism functions as a conversion device for converting the output torque of the normal and reverse rotation of the motor shaft 39 to thrust of a reciprocal motion of the steering rod 35 in the longitudinal direction.

A first rotation angle sensor 52 and a second rotation angle sensor 53 are arranged so as to be mutually adjacent between the stator 38 and the first bearing 45 in the longitudinal direction of the motor shaft 39. The first rotation angle sensor 52 and the second rotation angle sensor 53 are desirably rotary encoders.

The first and second rotation angle sensors 52 and 53 are connected to both the ECU 21 and 22. The first and second rotation angle sensors 52 and 53 generate two-phase pulse train signals and zero-phase pulse train signals representing the standard rotation position in accordance with the rotation of the motor shaft 39, and supply the two-phase pulse train signals and zero-phase pulse train signals to both ECU 21 and 22 at predetermined sampling periods. The phase of the two-phase pulse train signals of the first rotation angle sensor 52 differs by only π/2 from the phase of the second rotation angle sensor 53. In the following description, the two-phase pulse train signals and zero-phase pulse train signals output from each rotation angle sensor are simply referred to as detection signals.

The first ECU 21 and the second ECU 22 determine the rotation angle of the motor shaft 39 relative to the stator 38 based on the received detection signals.

The control unit 300 is described below.

The control unit 300 is provided with a first ECU 21, a second ECU 22, a first drive circuit 55, and a second drive circuit 57. The first drive circuit 55 functions as a first drive means, and the second drive circuit 57 functions as a second drive means.

1. First ECU 21

Figure 5:
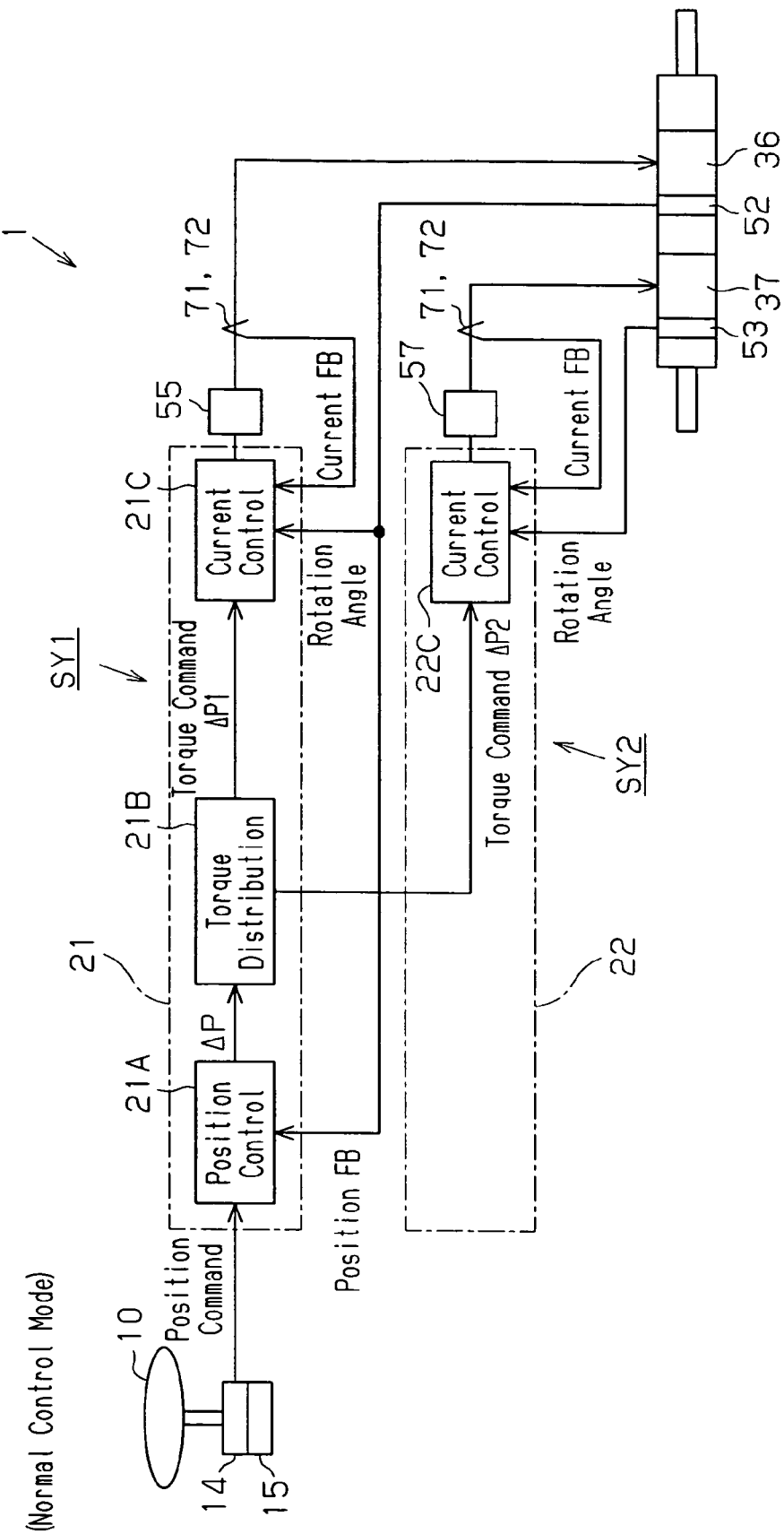
FIG. 5 illustrates the operation of the steering control apparatus in a normal control mode.

As shown in FIG. 5, the first ECU 21 includes a position controller 21A, a torque distributor 21B, and a current controller 21C; the first ECU 21 is a microcomputer which performs calculation functions, processing functions, and memory functions.

The control modes of the first ECU 21 include a start control mode executed when starting the vehicle engine, and a normal control mode executed at times other than when starting the engine.

In the starting control mode and the normal control mode, the first ECU 21 drives the first motor 36 with the first drive circuit 55 so as to match the turning angle of the steered wheels T with a target turning angle corresponding to the steering angle of the steering wheel 10 detected by the first steering angle sensor 14, that is, so as to generate the thrust required to obtain a target turning angle.

For example, the position controller 21A receives the steering angle of the steering wheel 10 detected by the first steering angle sensor 14. The steering angle of the steering wheel 10 is a value specifying the target rotation angle of the motor shaft 39. Furthermore, the position controller 21A receives a detection signal from the first rotation angle sensor 52, and calculates the actual rotation angle of the motor shaft 39 relative to the stator 38 based on this detection signal. The detection signal of the first rotation angle sensor 52 includes position information of the electric motor.

The position controller 21A calculates the difference between the actual rotation angle of the first motor 36 (motor shaft 39) and the target rotation angle of the motor shaft 39 corresponding to the steering angle of the steering wheel 10. The position controller 21A generates a torque command ΔP by multiplying the aforesaid difference by a predetermined gain required for the turning angle of the steered wheels T, i.e., the position control of the steering rod 35, and supplies this torque command ΔP to the torque distributor 21B. The torque command ΔP is equivalent to a first torque command generated based on the position control processing result.

The position controller 21A controls position feedback such that the difference between the command value (target rotation angle of the motor shaft 39) and the feedback value (actual rotation angle of the motor shaft 39 via the first motor 36) is zero.

The torque distributor 21B distributes the torque command ΔP to the two systems. That is, the torque distributor 21B divides the torque command ΔP into a torque command ΔP1 for the first system SY1 and a torque command ΔP2 for the second system SY2, and respectively supplies the divided torque commands ΔP1 and ΔP2 to the current controller 21C of the first system SY1 and the current controller 22C of the second system SY2. The ratio (torque distribution ratio) of the two torque commands ΔP1 and ΔP2 is determined by the torque distributor 21B.

When both systems SY1 and SY2 are normal, it is desirable that the torque distributor 21B changes the torque distribution ratio such that the torque distribution ratio when starting the engine of the vehicle is different from the torque distribution ratio at times other than when starting the engine.

For example, in the start control mode, the torque distribution ratio is 50:0 (Δp1:ΔP2), and in the normal control mode, the torque distribution ratio is 50:50 (ΔP1:ΔP2).

The drive control of the first motor 36 executed by the first ECU 21 includes position control for controlling the turning angle of the steered wheels T in accordance with the steering angle of the steering wheel 10, and torque control for obtaining a thrust required for the position control, or for obtaining the torque output of the electric motor.

Figure 6:
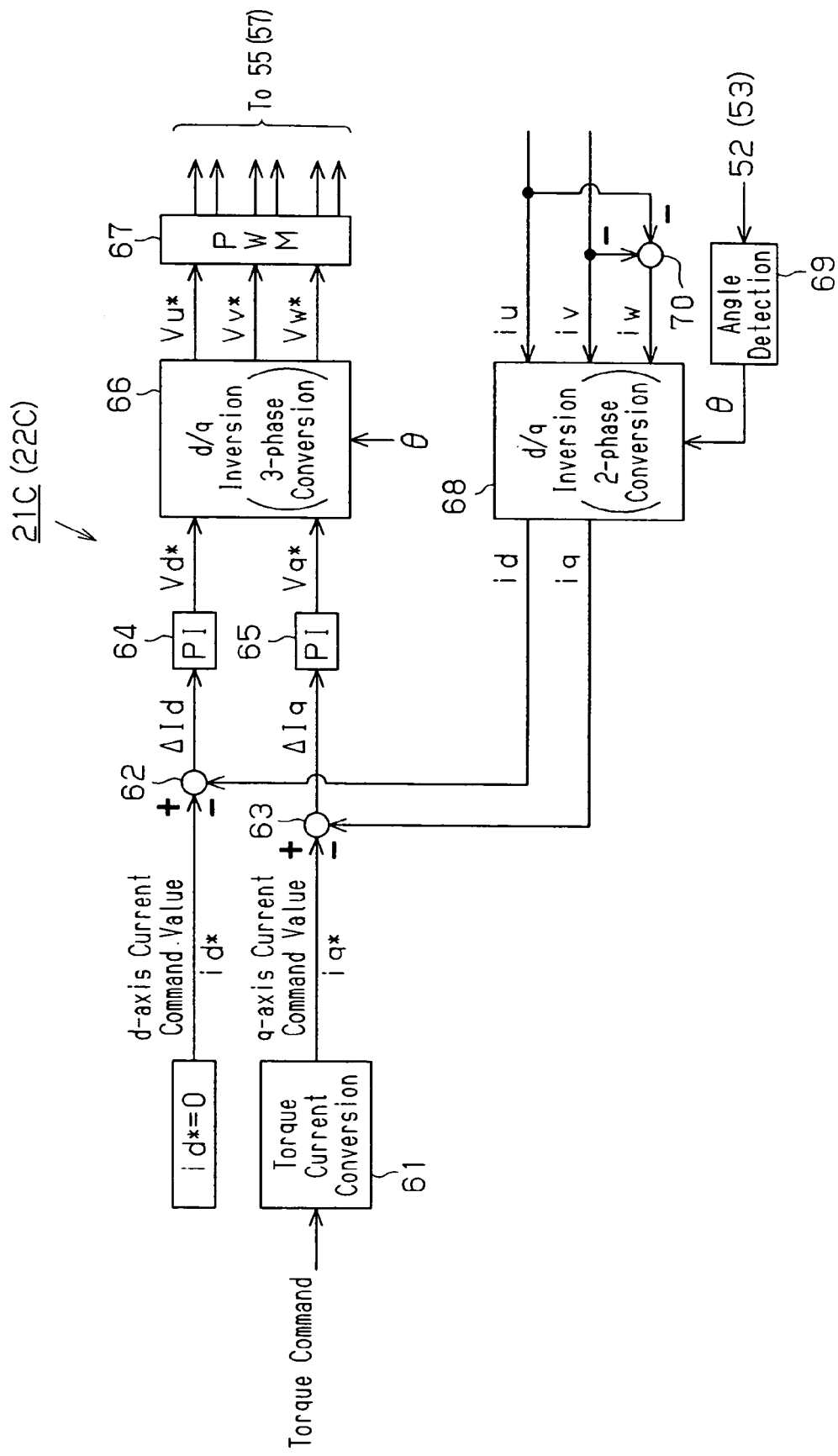
FIG. 6 is a block diagram of a current control unit.

As shown in FIG. 6, the current controller 21C includes a torque current converter 61, two PI controllers 64 and 65, a d/q inverter 66, a pulse width modulator (PWM) 67, a d/q converter 68, and an angle detector 69.

In the normal control mode, the current controller 21C receives a torque command ΔP1, a detection signal of the first rotation angle sensor 52, and current detection signals relating to two excitation currents iu and iv among the three-phase excitation currents iu, iv, and iw of the first motor 36 supplied from the current sensors 71 and 72.

The angle detector 69 calculates the rotation angle θ of the motor shaft 39 from the detection signal of the first rotation angle sensor 52 ands supplies the rotation angle θ to the d/q converter 68. A calculator 70 calculates the excitation current iw based on the current detection signals related to the excitation currents iu and iv, and supplies the current detection signal related to the excitation current iw to the d/q converter 68.

The excitation currents iu, iv, and iw are excitation currents actually supplied to the first motor 36.

The d/q converter 68 subjects the three current detection signals (iu, iv, iw) to d/q conversion using the rotation angle θ so as to generate current values id and iq, which are respectively supplied to two deviation calculators 62 and 63.

The d/q conversion is a well-known method for converting an alternating current to a direct current by mapping the vectors of the alternating current of each phase in a coordinate system in which a direction identical to the magnetic flux of the electric motor rotor is designated the d-axis, and a direction perpendicular to the d-axis is designated the q-axis.

The torque current converter 61 converts the torque command ΔP1 to a q-axis current command value iq*, and supplies the q-axis current command value iq* to the deviation calculator 63. The deviation calculator 63 calculates the difference ΔIq between the q-axis command value iq* and the current value iq.

The deviation calculator 62 calculates the difference ΔId between the d-axis current command value id* and the current value id. In the brushless DC motor of the present embodiment, the rotor is a permanent magnet, and excitation current is unnecessary. Accordingly, the d-axis current command value id* is normally zero.

The PI controller 64 performs the proportional and integral action of the difference ΔId, and calculates a d-axis voltage command value Vd* using a voltage equation. The PI controller 65 calculates proportional integrals of the difference ΔIq, and calculates a q-axis voltage command value Vq* using a voltage equation.

The d/q inverter 66 calculates voltage command values Vu*, Vv*, and Vw* using the d-axis voltage command value Vd* and the q-axis voltage command value Vq*, and supplies the voltage command values Vu*, Vv*, and Vw* to the pulse width modulator 67. The pulse width modulator 67 supplies a plurality of pulse signals (PWM control signals) having pulse widths respectively corresponding to the voltage command values Vu*, Vv*, and Vw* to the first drive circuit 55. The first drive circuit 55 applies drive voltages for each phase of the motor 36 in accordance with the pulse signals (PWM control signals).

In this way, the current controller 21C controls the current feedback such that the difference between the command value (torque command ΔP1) and the feedback value (current value iq and current value id of the first motor 36) is zero. This control is equivalent to torque control.

Figure 7:
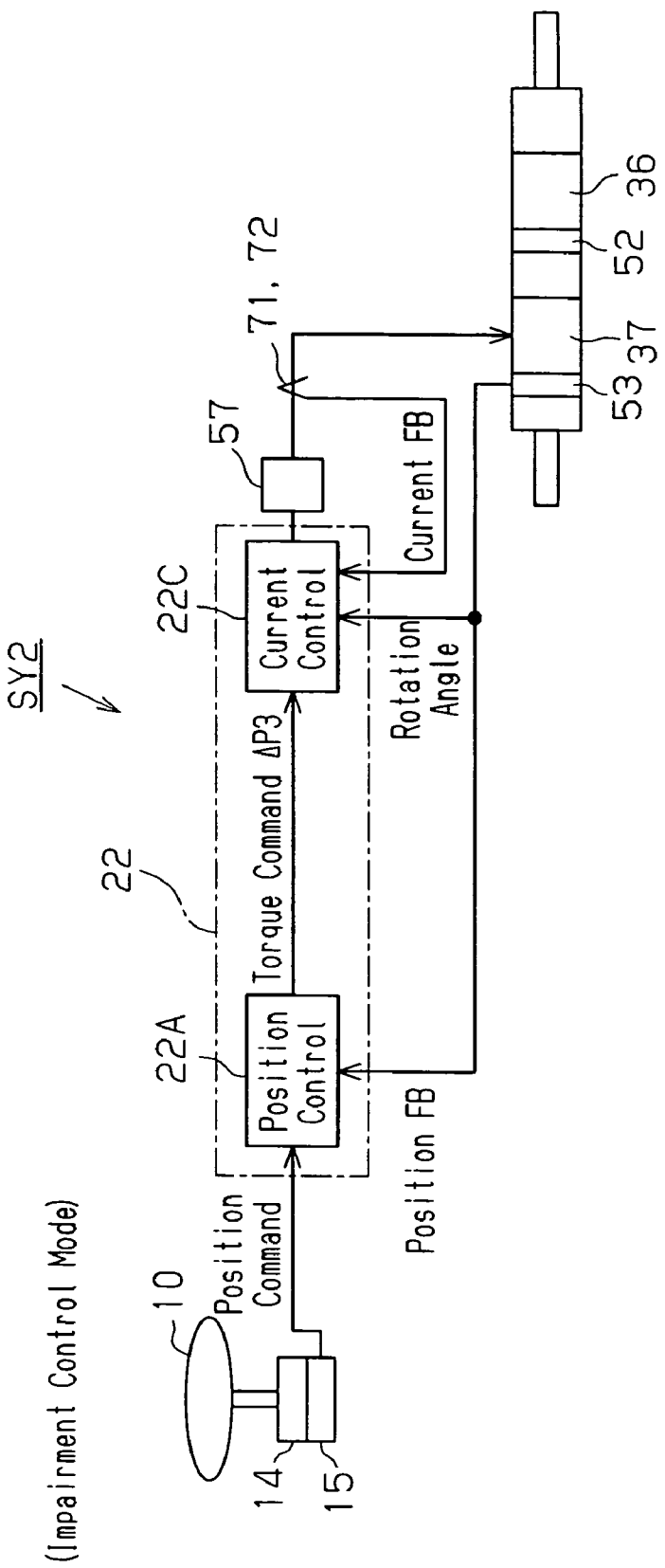
FIG. 7 illustrates the operation of the steering control apparatus in an impairment control mode.

When the first system SY1 is impaired, the first ECU 21 stops the control of the first motor 36, as shown in FIG. 7.

2. Second ECU 22

The second ECU 22 is a microcomputer having calculation functions, processing functions, and memory functions, and having a start control mode, normal control mode, and impairment control mode.

The second ECU 22 includes a current controller 22C activated by a start control mode and a normal control mode (FIG. 5), and a position controller 22A and current controller 22C activated by an impairment control mode.

In the start control mode and normal control mode, the current controller 22C receives a torque command ΔP2, detection signal of the second rotation angle sensor 53, and current detection signals relating to the two excitation currents iu and iv among the three-phase excitation currents iu, iv, and iw of the second motor 37 supplied from the current sensors 71 and 72, as shown in FIG. 5.

Like the current controller 21C shown in FIG. 6, the current controller 22C includes a torque current converter 61, two PI controllers 64 and 65, a d/q inverter 66, a pulse width modulator 67, a d/q converter 68, and an angle detector 69.

The operation of the current controller 22C in the normal control mode is identical to that of the current controller 21C.

In the same manner as the various parts of the current controller 21C, the various parts of the current controller 22C process the torque command ΔP2, detection signal of the second rotation angle sensor 53, and current detection signals relating to the excitation currents iu and iv supplied from the current sensors 71 and 72. The plurality of pulse signals (PWM control signals) generated by this processing are supplied from the second ECU 22 to the second drive circuit 57. The second drive circuit 57 applies a drive voltage generated in accordance with the pulse signals (PWM control signals) to each phase of the second motor 37.

As described above, the current controller 22C controls current feedback such that the difference between the command value (torque command ΔP2) and the feedback value (current value iq and current value id of the second motor 37) is zero. This control is equivalent to torque control.

In the start control mode, since the distribution ratio ΔP1:ΔP2 is 50:0 (ΔP1:ΔP2), the torque command ΔP2 supplied to the current controller 22C is zero. Accordingly, in the start control mode, the second motor 37 is not driven by the second ECU 22.

The impairment control mode executed by the second ECU 22 when the first system SY1 is impaired is described below. In the impairment control mode, the drive control of the second motor 37 executed by the second ECU 22 includes position control for controlling the turning angle of the steered wheels T in accordance with the steering angle of the steering wheel 10, and torque control for obtaining a thrust, or an output torque of the electric motor, required for the position control.

In the impairment control mode, the second ECU 22 drives the second motor 37 via the second drive circuit 57 so as to have the turning angle of the steered wheels T match a target turning angle corresponding to the steering angle detected by the second steering angle sensor 15, or to generate the thrust required to obtain a target turning angle.

For example, the position controller 22A receives the steering angle detected by the second steering angle sensor 15. The steering angle is a value commanding a target rotation angle for the motor shaft 39. Furthermore, the position controller 22A receives a detection signal from the second rotation angle sensor 53, and calculates the rotation angle of the motor shaft 39 relative to the stator 38 based on this detection signal.

The detection signal from the second rotation angle sensor 53 includes position information (rotation angle of the motor shaft 39) of the second motor 37.

The position controller 22A calculates the difference between the actual rotation angle of the motor shaft 39 and the target rotation angle of the motor shaft 39 corresponding to the steering angle of the steering wheel 10, and generates a torque command ΔP3 by multiplying this difference by a predetermined gain required for the position control of the steering rod 35, or the turning angle of the steered wheels T, and thereafter supplies this torque command ΔP3 to the current controller 22C. The torque command ΔP3 is equivalent to a second torque command.

The position controller 22A executes position control such that the difference between the command value (target rotation angle of the motor shaft 39) and the feedback value (actual rotation angle of the motor shaft via the second motor 37) is zero.

The torque command ΔP3 is described below.

The turning angle of the steered wheels T is greatly affected by the road surface reaction. When the vehicle is moving and the road surface reaction is comparatively small, a torque command ΔP3 is generated such that the angle of the steered wheels T, which are turned by the torque from only the second motor 37 driven in accordance with the torque command ΔP3, is identical to the angle of the steered wheels T, which are turned by the torque obtained by driving both motors 36 and 37 during normal operation of both systems SY1 and SY2.

When turning while the vehicle is stopped and the road surface reaction is comparatively great, a torque command ΔP3 is generated such that the torque generated by the second motor 37 alone operated in accordance with the torque command ΔP3 turns the steered wheels T to an angle smaller than the corresponding steering angle when both systems SY1 and SY2 are normal.

In the present embodiment, the torque command ΔP3 is the same value as the torque command ΔP2 in the normal control mode.

The operation of the current controller 22C in the impairment control mode is identical to the operation of the current controller 22C in the normal control mode (FIG. 6).

The current loop gain of the PI controllers 64 and 65 of the current controller 22C in the impairment control mode is desirably set so as to be different from that of the normal control mode. The current loop gain is the integral gain and proportional gain in the PI controllers 64 and 65. In the first embodiment, the gains in the impairment control mode are greater than the gains in the normal control mode. Since the current loop gain is set so as to be greater in the impairment control mode than in the normal control mode, the response of the motor relative to the operation of the steering wheel 10 is not decreased and the follow-up of the steered wheels T is not decreased.

The various parts of the current controller 22C process the torque command ΔP3, detection signal of the second rotation angle sensor 53, and current detection signals relating to the excitation currents iu and iv supplied from the current sensors 71 and 72. The plurality of pulse signals (PWM control signals) generated by this processing are supplied from the second ECU 22 to the second drive circuit 57. The second drive circuit 57 applies a drive voltage generated in accordance with the pulse signals (PWM control signals) to each phase of the second motor 37.

As described above, the current controller 22C controls current in the impairment control mode such that the difference between the command value (torque command ΔP3) and the feedback value (current value iq and current value id of the second motor 37) is zero. This current control is equivalent to torque control.

The steering control apparatus 1 of the present embodiment has a redundant structure formed by the two systems SY1 and SY2. The first system SY1 includes the first ECU 21, the first steering angle sensor 14, the first drive circuit 55, and the first motor 36. The second system SY2 includes the second ECU 22, the second steering angle sensor 15, the second drive circuit 57, and the second motor 37.

The first drive circuit 55 is described below with reference to FIG. 4. The second drive circuit 57 has a structure identical to that of the first drive circuit 55, and the reference numbers of the second drive circuit 57 are indicated in parentheses in FIG. 4.

The first drive circuit 55 includes a U-phase series-connected circuit configured by field-effect transistors (FETs) 81U and 82U a V-phase series-connected circuit configured by FETs 81V and 82V, and a W-phase series-connected circuit configured by FETs 81W and 82W. The three series-connected circuits are connected to one another in parallel. Each series-connected circuit is connected to a battery B installed in the vehicle, and the series-connected circuits are supplied with voltage from the battery B. A generator may also be used instead of the battery B. A node 83U disposed between the FETs 81U and 82U is connected to the U-phase coil of the first motor coil 41, a node 83V disposed between the FETs 81V and 82V is connected to the V-phase coil of the first motor coil 41, and a node 83W disposed between the FET 81W and the series-connected circuit is connected to the W-phase coil of the first motor coil 41.

Two current sensors 71 and 72 are provided in two of the three-phase excitation current paths (for example, U-phase and V-phase). The current sensors 71 and 72 respectively detect two excitation currents iu and iv among the three-phase excitation currents iu, iv, and iw of the first motor 36, and supply the currents to the first ECU 21.

The first ECU 21 supplies PWM control signals to the FETs 81U, 82U, 81V, 82V, 81W, 82W.

The first drive circuit 55 generates three-phase excitation currents in accordance with the PWM control signals, and respectively supplies these three-phase excitation currents to the first motor 36 through the three-phase excitation current paths.

Figure 4:
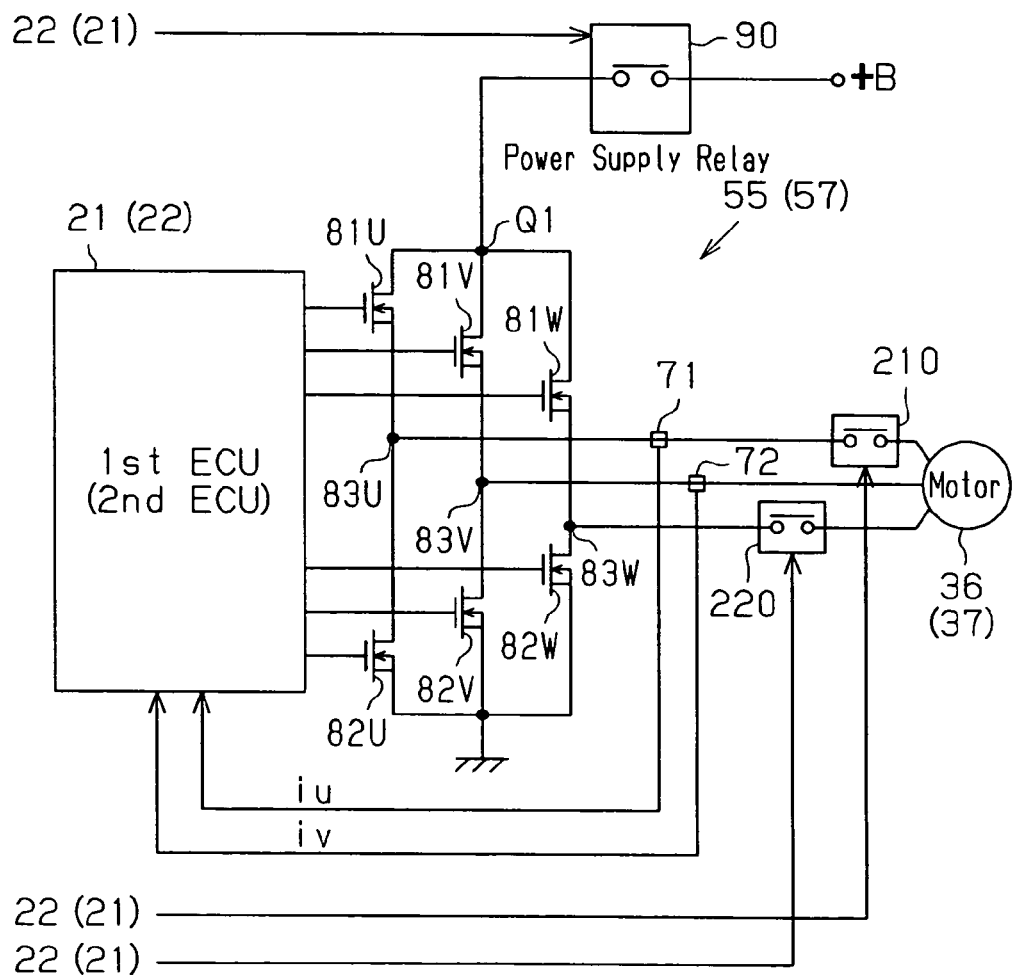
FIG. 4 is an electric circuit diagram of a first drive circuit.

As shown in FIGS. 1 and 4, a power supply relay 90 is provided between the battery B (or generator) and a node Q1. The power supply relay 90 is normally closed, but is opened in response to a control signal from the second ECU 22 and turns OFF the connection between the first drive circuit 55 and the battery B.

A phase release relay 210 is provided between the node 83U and the first motor 36. A phase release relay 220 is provided between the node 83W and the first motor 36. Although the phase release relays 210 and 220 are normally closed, they are opened in response to a control signal from the second ECU 22, and turn OFF the connection between the first drive circuit 55 and the motor 36.

Furthermore, the first ECU 21 and the second ECU 22 are provided with mutual monitoring functions (watchdog function) for normal mutual communication and exchanging actual rotation angle of the associated motor (calculated value), detection values of various types of associated sensors, various types of information for motor control and error information (abnormality determination signal). For example, when the rotation angle of the motor shaft 39 calculated by both ECU 21 and 22 match, the ECU 21 and 22 determine that the other system SY1 or SY2 (or ECU 22, 21) is normal. However, when the rotation angle of the motor shaft 39 calculated by both the ECU 21 and.22 are mismatched, the ECU 21 and 22 determine that the other system SY1 or SY2 (or ECU 22, 21) is abnormal and communicates error information (abnormality determination signal) to the other ECU 22 or 21 regardless of whether or not the motor shaft 39 is common to both systems SY1 and SY2. In the following description, error information sent from the first ECU 21 to the second ECU 22 is designated $\alpha 12$, and error information sent from the second ECU 22 to the first ECU 21 is designated $\alpha 21$.

When the ECU of one system (for example, ECU 21 of system SY1) determines the other system (for example, SY2) is abnormal, the ECU (21) of the former system turns OFF the power supply relay 90, and phase release relays 210 and 220 of the other system (SY2).

The first ECU 21 and the second ECU 22 respectively function as control means and impairment detecting means of the first system SY1 and second system SY2.

The operation of the steering control apparatus 1 of the first embodiment is described below.

Figure 8:
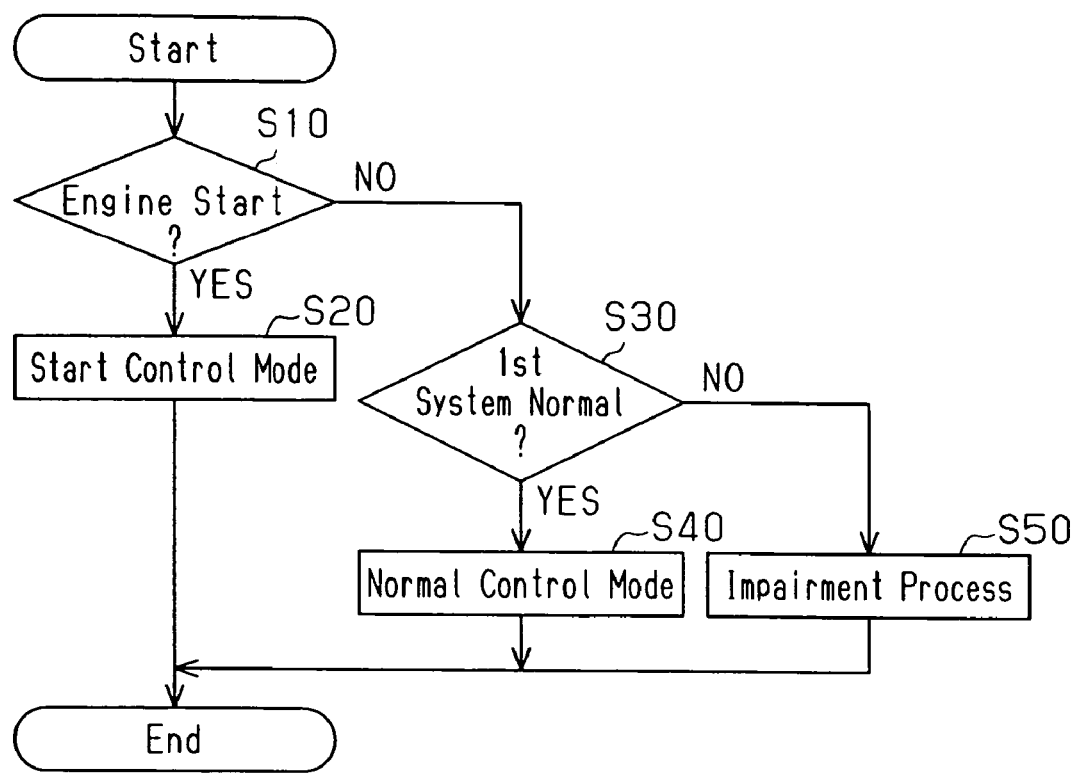
FIG. 8 is a flow chart of the control executed by a first ECU.

FIG. 8 is a flow chart of the control program executed by the first ECU 21 at predetermined intervals.

In step S10, the first ECU 21 checks whether or not it is engine starting time, or whether the engine has been started. When it is within a predetermined time after an ON signal from an ignition switch (not shown) has been supplied to the first ECU 21 of the first system SY1, the first ECU 21 determines that it is the engine starting time (S10: YES). If the predetermined time has elapsed since an ON signal was received, the first ECU 21 determines that the engine has already been started (S10: NO). When starting the engine, the first ECU 21 executes processing of the start control mode in step S20.

Accordingly, the first ECU 21 is set in the start control mode within the period after the receipt of the ON signal from the ignition switch until the predetermined time has elapsed. The second ECU 22 enters the start control mode in response to a torque command $\Delta P2$ from the first ECU 21.

When the predetermined time has elapsed after receiving the ON signal from the ignition switch (S10: NO), a check is made in step S30 to determine whether or not the first system SY1 is normal.

Specifically, the second ECU 22 and the first ECU 21 are linked by a communication line (not shown). The second ECU 22 determines whether or not the first system SY1 is normal based on the actual rotation angle of the first motor 36, which is received from the first ECU 21, detection values of various types of sensors of the second system SY2, and various types of information for motor control. If the first system SY1 is not normal, the second ECU 22 generates error information $\alpha 21$ (abnormality determination signal) and transmits the error information $\alpha 21$ to the first ECU 21. The first ECU 21 notifies that the first system SY1 is not normal based on the error information $\alpha 21$.

Abnormalities of the first system SY1 include abnormalities of one or more structural elements of the first system SY1, such as sensors (first steering angle sensor 14), the first ECU 21, the first drive circuit 55 and the like.

When the first system SY1 is normal (step S30:YES), then in step S40, the normal control process is executed by the first ECU 21. In step S40, the first motor 36 and the second motor 37 are driven simultaneously in accordance with the torque command $\Delta P1$ and the torque command $\Delta P2$.

In the second system SY2, the second ECU 22 enters the normal control mode in response to the torque command $\Delta P2$ supplied from the first ECU 21 set in the normal control mode.

When the first system SY1 is abnormal (step S30: NO), however, then in step S50, the first ECU 21 executes the impairment process. In the impairment process, the first ECU 21 stops supplying PWM control signals to the first drive circuit 55. The second ECU 22 turns OFF the power supply relay 90 and the phase release relays 210 and 220 of the first system SY1 simultaneously with the output of the error information $\alpha 21$ to the first ECU 21. As a result, an excitation current is not supplied to the first motor coil 41 of the first motor 36, and the output torque of the first motor 36 stops.

In the second system SY2, the second ECU 22 enters the impairment control mode after outputting the error information $\alpha 21$. This time, the second ECU 22 continuously drives the second motor 37 such that the motor shaft 39 is driven in an identical manner as during normal operation time (i.e., when the first motor 36 is driven). However, when the vehicle is moving, it is possible to adequately turn the steered wheels T even though the output torque is half the output torque during the normal operation time.

Furthermore, since the phase release relays 210 and 220 of the first system SY1 are turned OFF, the first motor 36 does not generate power, and there is no power generation damping to diminish the thrust of the second motor 37.

The first embodiment has the following advantages.

(1) The steering control apparatus 1 of the first embodiment is provided with the systems SY1 and SY2, which include the first motor 36 and the second motor 37 arranged coaxially and having essentially identical performance, and the ECUs 21 and 22 (control means) for respectively controlling the plurality of motors 36 and 37. The plurality of ECUs 21 and 22 simultaneously control the associated motors 36 and 37 to drive the common steering rod 35. The first ECU 21 of the first system SY1 generates a torque command $\Delta P$ (first torque command) for driving the steered wheel drive mechanism 200 based on the operating position of the steering wheel 10 and the position information of the associated first motor 36, and distributes the torque command $\Delta P$ to the total number of systems SY1 and SY2 (two systems in the present embodiment). Then, the first ECU 21 controls the torque of the first motor 36 in accordance with the torque command $\Delta P1$ distributed to the first system SY1. In the other system, or the second system SY2, the second ECU 22 controls the torque of the second motor 37 in accordance with the torque command $\Delta P2$ distributed to the second system SY2.

In this way, the first system (SY1) manages a high order control loop (position control), calculates the torque required for steering control, and distributes the calculated torque to the total number of normally operating systems (two). Each system (SY1, SY2) performs a low order control loop (torque control). Since the position control of the steered wheels T (steering rod 35 or electric motor) is performed by the first system SY1 alone, even when both motors 36 and 37 are driven together, there is no torque interference between the two motors 36 and 37, there is no reduction in torque caused by torque interference, and there is no reduction in responsiveness or follow-up relative to the operation of the steering wheel 10. Since there is no torque interference, noise, vibration, and heat are not generated.

Figure 9:
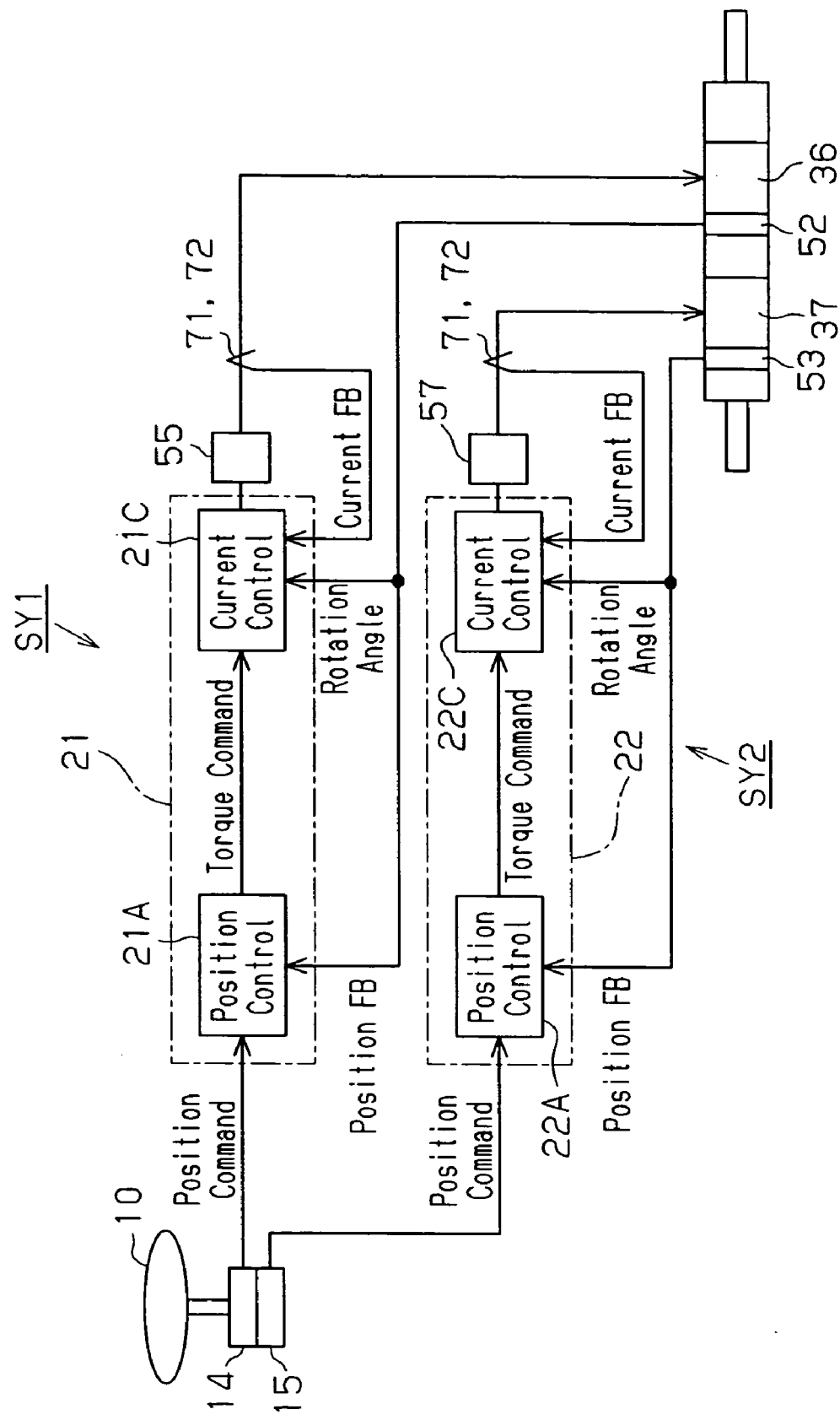
FIG. 9 is a schematic diagram showing a prior art steering control apparatus.

In contrast, in the controls of the conventional prior art apparatus shown in FIG. 9, the ECUs 21 and 22 respectively execute position feedback control for the associated first motor 36 and second motor 37 based on the rotation angles of the first motor 36 and the second motor 37 detected by the first rotation angle sensor 52 and the second rotation angle sensor 53. However, the two motors 36 and 37 are controlled to mutually different positions due to assembly errors of both the motors 36 and 37 and assembly errors of both the rotation angle sensors 52 and 53, such that torque is reduced because the generated torque directions do not match, noise and vibration are generated, and the electric motor generates heat.

(2) The first ECU 21 of the first system SY1 detects impairment of the systems other than the first system SY1 (i.e., the second system SY2), and the second ECU 22 of the second system SY2 detects impairment of the systems other than the second system SY2 (i.e., the first system SY1). When the first system, which generates the torque command $\Delta P$, is impaired, the second ECU 22 of the second system SY2 generates a torque command $\Delta P3$ (second torque command) based on position information of the motor 37 of the second system SY2 and the operating position of the steering wheel 10, and distributes the torque command $\Delta P3$ with the number of normally operating systems (one in the first embodiment), and controls the torque of the motor 37 in accordance with the torque command $\Delta P3$ distributed to the second system SY2.

Accordingly, even when the first system SY1 is impaired, the turning of the steered wheels T can be backed up by driving the second motor 37 with the second system SY2.

In this way, when the system (SY1) which manages the high order control loop (position control) is included in the systems which are impaired, one of the other normal systems (SY2) freshly manages the high order control loop so as to again distribute the calculated total required torque in accordance with the number of normally operating systems. Since there is no difference in performance between the plurality of motors 36 and 37, there is no restriction on the distribution of torque when one system is impaired, torque control is made easier, and there is no reduction in operating sensitivity (response, follow-up) of the steering wheel 10 even when an impairment occurs in the steering control apparatus 1.

(3) When the first system SY1 is impaired, the current controller 22C of the second system SY2 increases the current loop gain to be greater than that in the normal control mode so as to supplement the impaired part of the first system SY1. Accordingly, a reduction in responsiveness to the operation of the steering wheel 10 is suppressed when the first system SY1 is impaired.

A steering control apparatus 1 according to a second embodiment is described below with reference to FIGS. 10 and 11 by focusing on differences with the first embodiment.

In the second embodiment, position feedback, current feedback control, and speed feedback control are performed.

The start control mode and normal control mode executed by the first ECU 21 are described below.

Figure 10:
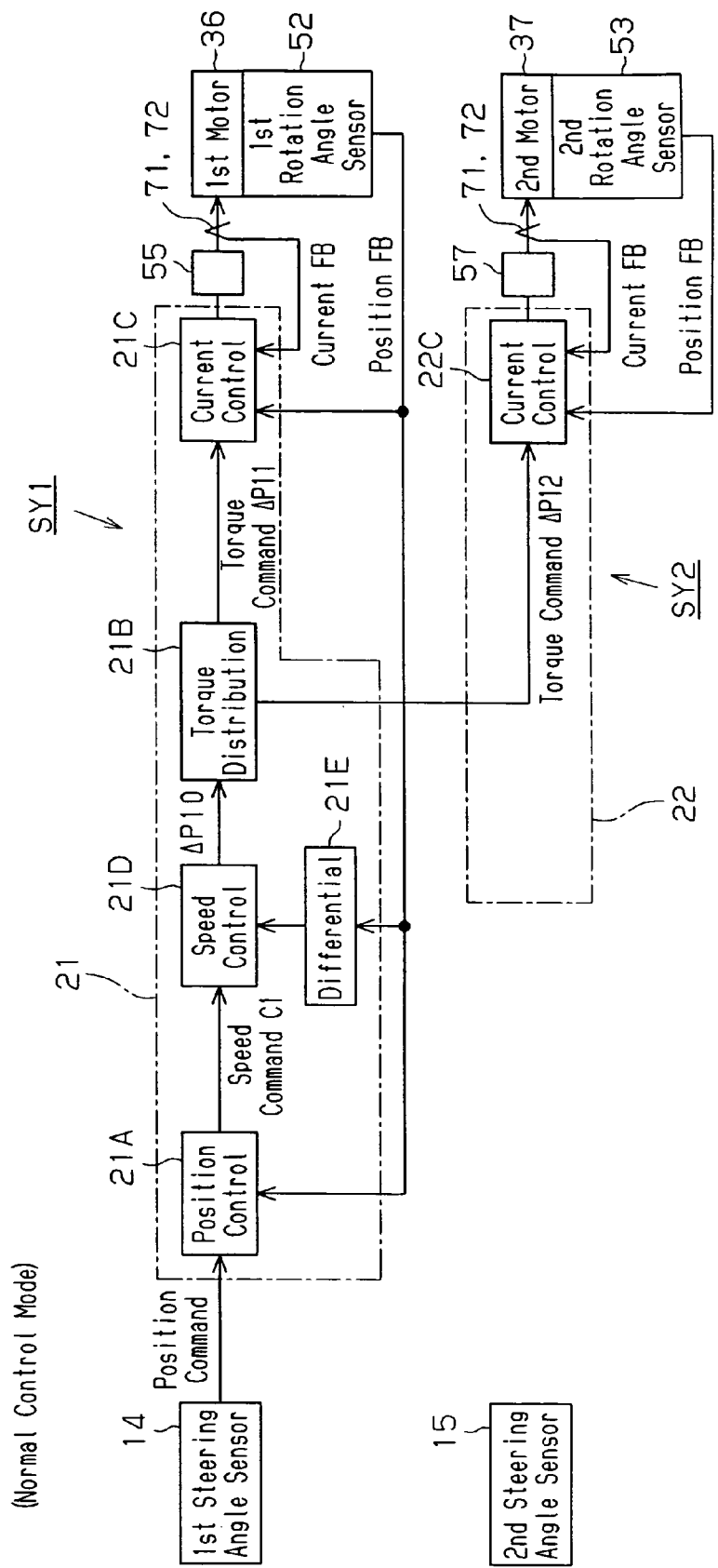
FIG. 10 is a diagram illustrating the operation of a steering control apparatus according to a second embodiment of the present invention in the normal control mode.

FIG. 10 shows the controls in the normal control mode.

In the starting control mode and the normal control mode, the first ECU 21 drives the first motor 36 via the first drive circuit 55 so as to match the turning angle of the steered wheels T to a target turning angle corresponding to the steering angle of the steering wheel 10 detected by the first steering angle sensor 14, that is, so as to generate the thrust required to obtain a target turning angle.

For example, the position controller 21A receives the steering angle of the steering wheel 10 detected by the first steering angle sensor 14. The steering angle of the steering wheel 10 is a value specifying the target rotation angle of the motor shaft 39. Furthermore, the position controller 21A receives a detection signal from the first rotation angle sensor 52, and calculates the actual rotation angle of the motor shaft 39 relative to the stator 38 based on this detection signal. The detection signal of the first rotation angle sensor 52 includes position information of the electric motor.

The position controller 21A calculates the difference between the actual rotation angle of the motor shaft 39 driven by the first motor 36, and the target rotation angle of the motor shaft 39 corresponding to the steering angle of the steering wheel 10. The position controller 21A generates a speed command C1 by multiplying this difference by a predetermined gain required for the turning angle of the steered wheels T, i.e., the position control of the steering rod 35, and supplies this steering command C1 to a speed controller 21D.

A differential processor 21E calculates the motor speed based on the detection signal of the first rotation angle sensor 52, and provides the calculated motor speed to the speed controller 21D.

The speed controller 21D calculates the difference between the speed command C1 and the actual motor speed, multiplies this difference by a predetermined gain required for turning speed control of the steered wheels T so as to generate a torque command $\Delta P10$, and provides this torque command $\Delta P10$ to the torque distributor 21B.

The torque command $\Delta P10$ is equivalent to the first torque command generated based on the speed control process result.

The torque distributor 21B distributes the torque command $\Delta P10$ to two systems. That is, the torque distributor 21B divides the torque command $\Delta P10$ into a torque command $\Delta P11$ for the first system SY1 and a torque command $\Delta P12$ for the second system SY2, and respectively supplies the two divided torque commands $\Delta P11$ and $\Delta P12$ to the current controller 21C of the first system SY1 and the current controller 22C of the second system SY2.

When both systems SY1 and SY2 are normal, it is desirable that the torque distributor 21B changes the torque distribution ratio such that the torque distribution ratio when starting the engine of the vehicle is different from the torque distribution ratio at times other than when starting the engine. For example, in the start control mode, the torque distribution ratio is $\Delta P1:\Delta P2=50:0$, and in the normal control mode, the torque distribution ratio is $\Delta P1:\Delta P2=50:50$.

The drive control of the first motor 36 executed by the first ECU 21 includes position control for controlling the turning angle of the steered wheels T in accordance with the steering angle of the steering wheel 10, speed control for controlling the motor speed to a speed corresponding to the speed command C1, and torque control for obtaining a thrust required for the position control, i.e., for obtaining the torque output of the electric motor.

Since the structure of the current controller 21C is identical to that of the first embodiment, the current controller 21C will not be described.

The current controller 21C controls the current feedback such that the difference between the command value (torque command ΔP11) and the feedback value (current value iq and current value id of the first motor 36) is zero. This current control is equivalent to torque control.

2. Second ECU 22

The second ECU 22 is a microcomputer having calculation functions, processing functions, and memory functions, and executes a start control mode, normal control mode, and impairment control mode.

The second ECU 22 includes a current controller 22C activated by a start control mode and a normal control mode (FIG. 10), a position controller 22A, a current controller 22C, a speed controller 22D, and a differential processor 22E (FIG. 11).

In the start control mode and normal control mode, the current controller 22C receives a torque command ΔP12, a detection signal of the second rotation angle sensor 53, and current detection signals relating to the two excitation currents iu and iv among the three-phase excitation currents iu, iv, and iw of the second motor 37 supplied from the current sensors 71 and 72, as shown in FIG. 10.

Like the current controller 21C (refer to FIG. 6), the current controller 22C includes a torque current converter 61, two PI controllers 64 and 65, a d/q inverter 66, a pulse width modulator 67, a d/q converter 68, and an angle detector 69.

The operation of the current controller 22C in the normal control mode is identical to that of the current controller 21C.

In the same manner as the various parts of the current controller 21C, the various parts of the current controller 22C process the torque command ΔP12, detection signal of the second rotation angle sensor 53, and current detection signals relating to the excitation currents iu and iv supplied from the current sensors 71 and 72. The plurality of pulse signals (PWM control signals) generated by this process are supplied from the second ECU 22 to the second drive circuit 57. The second drive circuit 57 applies a drive voltage generated in accordance with the pulse signals (PWM control signals) to each phase of the second motor 37.

As described above, the current controller 22C controls current feedback such that the difference between the command value (torque command ΔP12) and the feedback value (current value iq and current value id of the second motor 37) is zero. This current control is equivalent to torque control.

In the start control mode, since the distribution ratio ΔP11:ΔP12 is 50:0, the torque command ΔP12 supplied to the current controller 22C is zero. Accordingly, in the start control mode, the second motor 37 is not driven by the second ECU 22.

The impairment control mode executed by the second ECU 22 when the first system SY1 is impaired is described below.

In the impairment control mode, the drive control of the second motor 37 executed by the second ECU 22 includes position control for controlling the turning angle in accordance with the steering angle, speed control for controlling the motor speed so as to correspond to the speed command C2, and torque control for obtaining a thrust, i.e., an output torque of the electric motor, required for the position control.

In the impairment control mode, the second ECU 22 drives the second motor 37 via the second drive circuit 57 so as to have the turning angle of the steered wheels T match a target turning angle corresponding to the steering angle detected by the second steering angle sensor 15, i.e., so as to generate the thrust required to obtain a target turning angle.

For example, the position controller 22A receives the steering angle detected by the second steering angle sensor 15. The steering angle is a value commanding a target rotation angle for the motor shaft 39. Furthermore, the position controller 22A receives a detection signal from the second rotation angle sensor 53, and calculates the rotation angle of the motor shaft 39 relative to the stator 38 based on this detection signal.

The detection signal from the second rotation angle sensor 53 is equivalent to position information of the second motor 37.

The position controller 22A calculates the difference between the actual rotation angle of the motor shaft 39 and the target rotation angle of the motor shaft 39 corresponding to the steering angle of the steering wheel 10, and generates a speed command C2 by multiplying this difference by a predetermined gain required for the position control of the steering rod 35, i.e., the turning angle of the steered wheels T, and thereafter provides this speed command C2 to the speed controller 22D.

The differential processor 22E calculates the motor speed based on the detection signal of the second rotation angle sensor 53, and provides this calculated motor speed to the speed controller 22D.

The speed controller 22D calculates the difference between the speed command C2 and the actual motor speed, and generates a torque command ΔP13 by multiplying this difference by a predetermined gain required for turning speed control of the steered wheels T, and provides this torque command ΔP13 to the current controller 22C.

The torque command ΔP13 is equivalent to the second torque command generated based on the speed control process result.

The speed controller 22D performs speed control such that the difference between the command value (speed command C2) and the feedback value (motor speed of the second motor 37) is zero.

The torque command P13 is described below.

When the vehicle is moving, a torque command ΔP13 is generated such that the angle of the steered wheels T turned by the torque generated by the second motor 37 operating in accordance with the torque command ΔP13 is identical to the angle of the steered wheels T turned by the torque obtained by the operation of both the motors 36 and 37 when both systems SY1 and SY2 are normal.

When the vehicle is stopped, a torque command ΔP13 is generated such that the torque obtained by driving the second motor 37 alone based on the torque command ΔP13 causes the steered wheels T to steer through an angle smaller than a steering angle corresponding to when both systems SY1 and SY2 are normal.

In the present embodiment, the torque command ΔP13 is a value identical to the torque command ΔP12 of the normal control mode.

The operation of the current controller 22C in the impairment control mode is similar to the operation of the current controller 21C in the normal control mode.

In the second embodiment, the current loop gain of the PI controllers 64 and 65 of the current controller 22C in the impairment control mode is desirably set so as to be different from that of the normal control mode. The current loop gain is the integral gain and proportional gain in the PI controllers 64 and 65. In the second embodiment, the gains in the impairment control mode are greater than the gains in the normal control mode. Since the current loop gain is set so as to be greater in the impairment control mode than in the normal control mode, there is no reduction in responsiveness of motor relative to the operation of the steering wheel 10, and a decrease in operating sensitivity of the steering wheel 10 (follow-up of the steered wheels T) is prevented.

The various parts of the current controller 22C process the torque command ΔP13, detection signal of the second rotation angle sensor 53, and current detection signals relating to the excitation currents iu and iv supplied from the current sensors 71 and 72. The plurality of pulse signals (PWM control signals) generated by this processing are supplied from the second ECU 22 to the second drive circuit 57. The second drive circuit 57 applies a drive voltage generated in accordance with the pulse signals (PWM control signals) to each phase of the second motor 37.

As described above, the current controller 22C controls current feed back in the impairment control mode such that the difference between the command value (torque command ΔP3) and the feedback value (current value iq and current value id of the second motor 37) is zero. This current control is equivalent to torque control.

The first ECU 21 and second ECU 22 function as the control means and impairment detection means of the first system SY1 and second system SY2.

The operation of the first ECU 21 and the second ECU 22 of the second embodiment is similar to that described in the first embodiment (refer to FIG. 8).

The second embodiment has the following advantages.

(1) In the steering control apparatus 1 of the second embodiment, the first ECU 21 of the first system SY1, in the normal control mode, executes position control based on the operating position of the steering wheel 10 and the position information of the first motor 36. The first ECU 21 executes speed control based on the command value (speed command C2) and feedback value (motor speed of the second motor 37). The first ECU 21 generates a torque command ΔP10 (first torque command) based on the speed control process result, and distributes the torque command ΔP10 in accordance with the number of systems. The first ECU 21 executes torque control relative to the first motor 36 based on the torque command ΔP11 distributed to the associated system (SY1) and the actual excitation currents iu, iv, and iw of the first motor 36 of the associated system (SY1).

In the normal control mode, the second ECU 22 of the second system SY2 executes torque control relative to the second motor 37 of the second system SY2 based on the torque command ΔP12 distributed to the second system SY2 and the actual excitation currents iu, iv, and iw of the second motor 37.

In this way, one system (SY1) manages a high order control loop (position control and speed control), calculates the torque required for steering control, and distributes the calculated torque to the total number of normally operating systems (two). Each system (SY1, SY2) executes a low order control loop (torque control). Since the position control of the steered wheels T (steering rod 35 or electric motor) is performed by the first system SY1 alone, even when both motors 36 and 37 are driven together, there is no torque interference between the two motors 36 and 37, and there is no reduction in responsiveness or follow-up relative to the operation of the steering wheel 10. Since there is no torque interference, noise, vibration, and heat are not generated.

Figure 18:
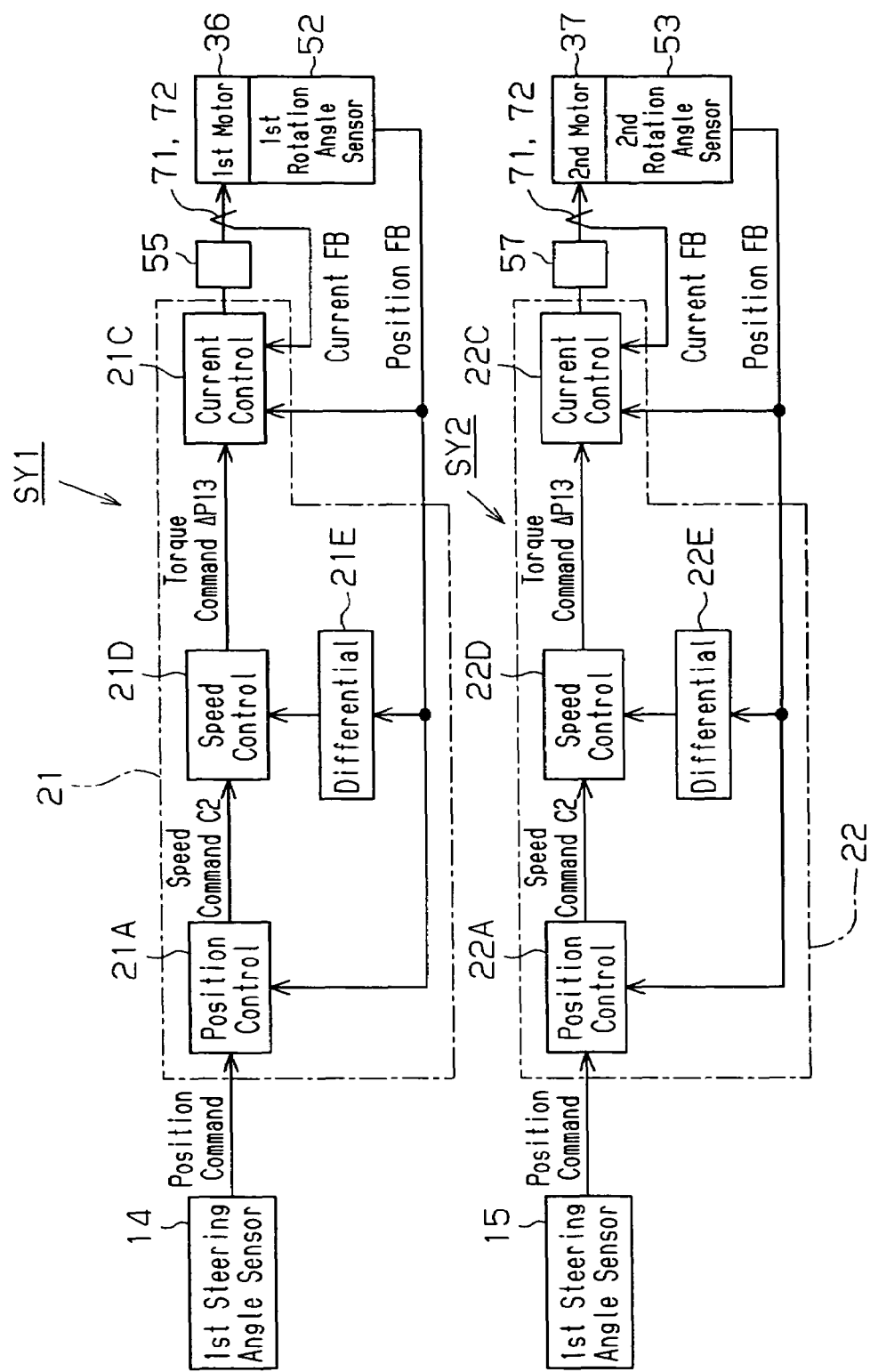
FIG. 18 illustrates the operation of a conventional art steering control apparatus.

In contrast, in the controls of the conventional prior art apparatus shown in FIG. 18, the ECUs 21 and 22 respectively execute position feedback controls for the associated first motor 36 and second motor 37 based on the rotation angles of the first motor 36 and the second motor 37 detected by the first rotation angle sensor 52 and the second rotation angle sensor 53. However, the two motors 36 and 37 are controlled to mutually different positions due to assembly errors of both the motors 36 and 37 and assembly errors of both the rotation angle sensors 52 and 53, such that torque is reduced because the generated torque directions do not match, noise and vibration are generated, and the electric motor generates heat.

(2) When the first system SY1 is impaired, the second ECU 22 of the second system SY2 executes position control based on the operating position of the steering wheel 10 and the position information of the second motor 37 of the second system SY2. The second ECU 22 generates a command value (speed command C2) based on the position control process result, and executes speed control based on the resulting command value and the feedback value (motor speed of the second motor 37). The second ECU 22 generates a torque command ΔP13 (second torque command) based on the speed control process result, and executes torque control based on this torque command ΔP13 (second torque command) and the actual excitation currents iu, iv, and iw of the second motor 37 of the second system SY2.

Accordingly, even when the first system SY1 is impaired, the turning of the steered wheels T can be backed up by driving the second motor 37 via the second system SY2.

In this way, when the system (SY1) which manages the high order control loop (position control and speed control) is included in the systems which are impaired, one of the other normally operating systems (SY2) freshly manages the high order control loop so as to again distribute the calculated total required torque in accordance with the number of normal systems.

Since there is no difference in performance between the plurality of motors 36 and 37, there is no restriction on the distribution of torque when one system is impaired, torque control is made easier. And, there is no reduction in responsiveness of motor relative to the operation of the steering wheel 10, and a decrease in operating sensitivity of the steering wheel 10 (follow-up of the steered wheels T) is prevented.

(3) When the first system SY1 is impaired, the current controller 22C of the second system SY2 increases the current loop gain to be greater than that in the normal control mode so as to supplement reduction in responsiveness relative to the operation of the steering wheel 10 due to the impaired part of the first system SY1. Accordingly, a reduction in responsiveness to the operation of the steering wheel 10 is suppressed when the first system SY1 is impaired.

The steering control apparatus 1 of a third embodiment is described below with reference to FIGS. 12 and 17 by focusing on differences with the second embodiment.

Figure 12:
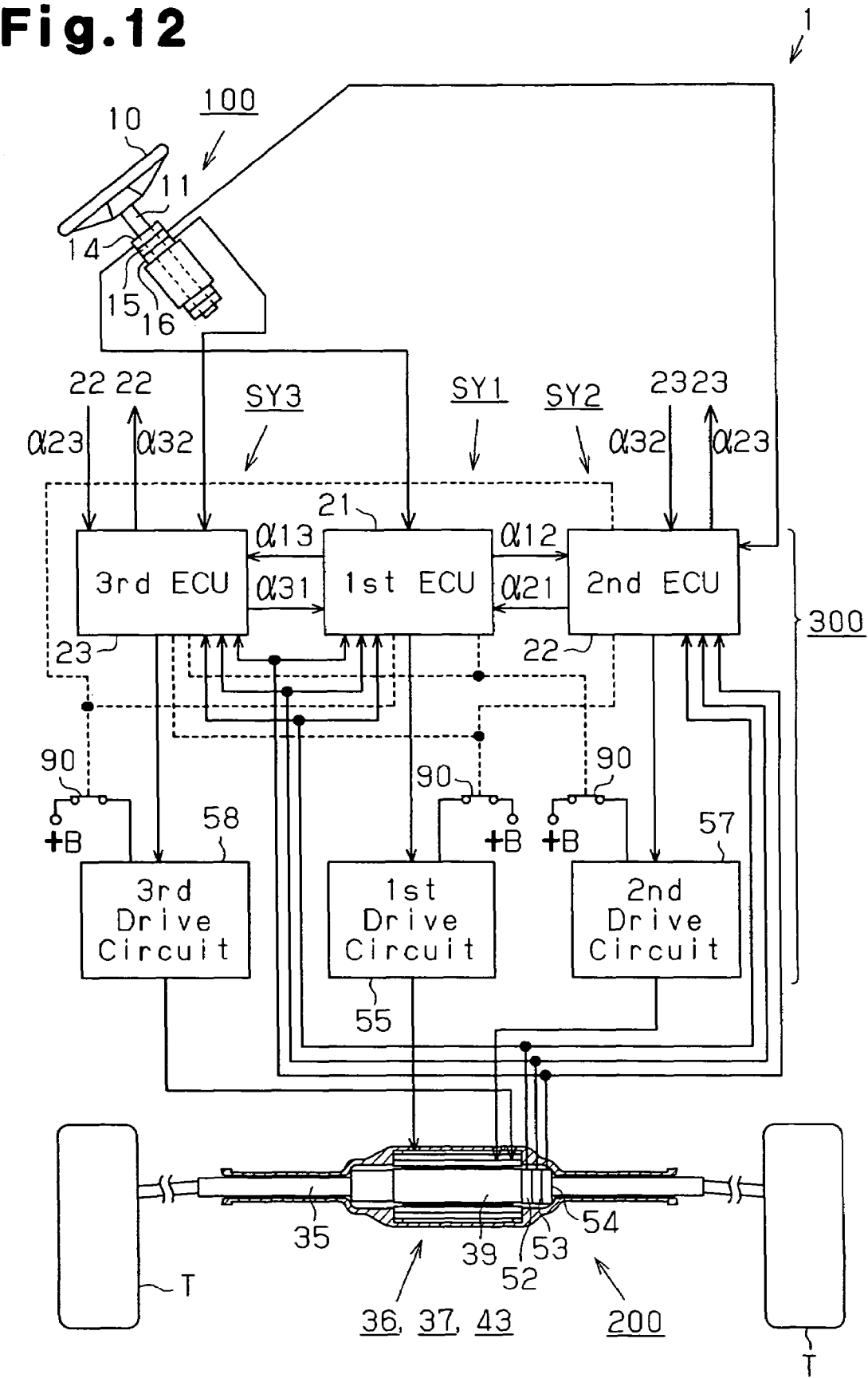
FIG. 12 is a schematic diagram showing a steering control apparatus according to a third embodiment of the present invention.

As shown in FIG. 12, the steering control apparatus 1 of the third embodiment includes an operating mechanism 100 including a steering wheel 10, a steered wheel drive mechanism 200, and a control unit 300. The steering control apparatus 1 of the third embodiment has three systems SY1, SY2, and SY3. The number of systems (three) differs from the number of systems in the second embodiment (two).

The first system SY1 includes a first ECU 21, a first steering angle sensor 14, a first drive circuit 55, and a first motor 36. The second system SY2 includes a second ECU 22, a second steering angle sensor 15, a second drive circuit 57, and a second motor 37. The third system SY3 includes a third ECU 23, a third steering angle sensor 16, a third drive circuit 58, and a third motor 43.

Three steering angle sensors 14, 15, 16 are provided on the steering shaft 11. The third steering angle sensor 16 is electrically connected to the third ECU 23.

Three motors 36, 37, 43 are provided in the steered wheel drive mechanism 200. The first motor 36, second motor 37, and third motor 43 have a common stator and rotor, or motor shaft 39, and are arranged co-axially. All motors 36, 37, and 43 are three-phase synchronous type brushless DC motors having essentially identical performance. The third motor 43 is controlled by the third ECU 23 with the third drive circuit 58.

The first drive circuit 55 functions as a first drive means, the second drive circuit 57 functions as a second drive means, and the third drive circuit functions as a third drive means.

The three rotation angle sensors 52, 53, and 54 are arranged in parallel along the motor shaft 39. It is desirable that each rotation angle sensor 52, 53, 54 be a rotary encoder.

The first rotation angle sensor 52, second rotation angle sensor 53, and third rotation angle sensor 54 respectively supply detection signals to the first ECU 21, second ECU 22, and third ECU 23 at predetermined sampling intervals. The first ECU 21, second ECU 22, and third ECU 23 respectively calculate the rotation angle of the motor shaft 39 of the first motor 36, second motor 37, and third motor 43 relative to the stator in accordance with the received detection signal.

The control unit 300 is described below.

The control unit 300 includes a first ECU 21, a second ECU 22, a third ECU 23, a first drive circuit 55, a second drive circuit 57, and a third drive circuit 58. The first ECU 21, the second ECU 22, and the third ECU 23 are microcomputers. The structure of the third ECU 23 is identical to the first ECU 21 and the second ECU 22 of the second embodiment.

The first ECU 21, second ECU 22, and third ECU 23 are connected to one another by a communication line. The first ECU 21, the second ECU 22, and the third ECU 23 are provided with mutual monitoring functions (watchdog function) for mutually communicating actual rotation angle of the first motor 36, second motor 37, and third motor 43, detection values of various types of sensors of the associated systems SY1, SY2, SY3, various types of information for motor control and error information (abnormality determination signal). That is, the ECU of one system simultaneously monitors the other two systems, and supplies error information of the associated system to the other two systems. In other words, error information from the two ECUs of the other two systems is provided to the ECU of the one system. Accordingly, the ECU of one system determines the condition (normal or abnormal) of all systems or each system based on error information supplied from the other two systems.

For example, when the rotation angle of the motor shaft 39 respectively calculated by the ECUs 21, 22, 23 mutually match, the ECUs 21, 22, and 23 determine that the other systems (ECUs) are normal, since the motor shaft 39 is common to the motors 36, 37, and 43. If there is abnormality, the ECUs send error information (abnormality determination signal) to the ECUs of the other systems.

Error information sent from the first ECU 21 to the second ECU 22 is designated $\alpha 12$, error information sent from the second ECU 22 to the first ECU 21 is designated ($\alpha 21$, error information sent from the second ECU 22 to the third ECU 23 is designated $\alpha 23$, error information sent from the third ECU 23 to the second ECU 22 is designated $\alpha 32$, error information sent from the first ECU 21 to the third ECU 23 is designated $\alpha 13$, and error information sent from the third ECU 23 to the first ECU 21 is designated $\alpha 31$.

For example, when one system determines that at least one of the other systems is abnormal, the former system executes processes to turn OFF the power supply relay 90, phase release relay 210, and phase release relay 220 of at least one of the other systems, and sets a mode in accordance with the condition (normal or abnormal) of at least one of the other systems.

That is, since the ECU of one system is aware of the condition of each system, that ECU executes processes in accordance with the condition of each system.

In this way the first ECU 21, second ECU 22, and third ECU 23 function as control means and impairment detection means of the associated system.

The functions of the first ECU 21, second ECU 22, and third ECU 23 are described below.

1. First ECU 21

When starting the engine, when all systems are normal, and when at least one system other than the first system SY1 is impaired, the first ECU 21 of the first system SY1 functions as the high order controller of the second and third systems SY2 and SY3. In other words, the first ECU 21 of the first system SY1 functions as a master controller, and the second and third ECUs 22 and 23 function as slave controllers.

Figure 14:
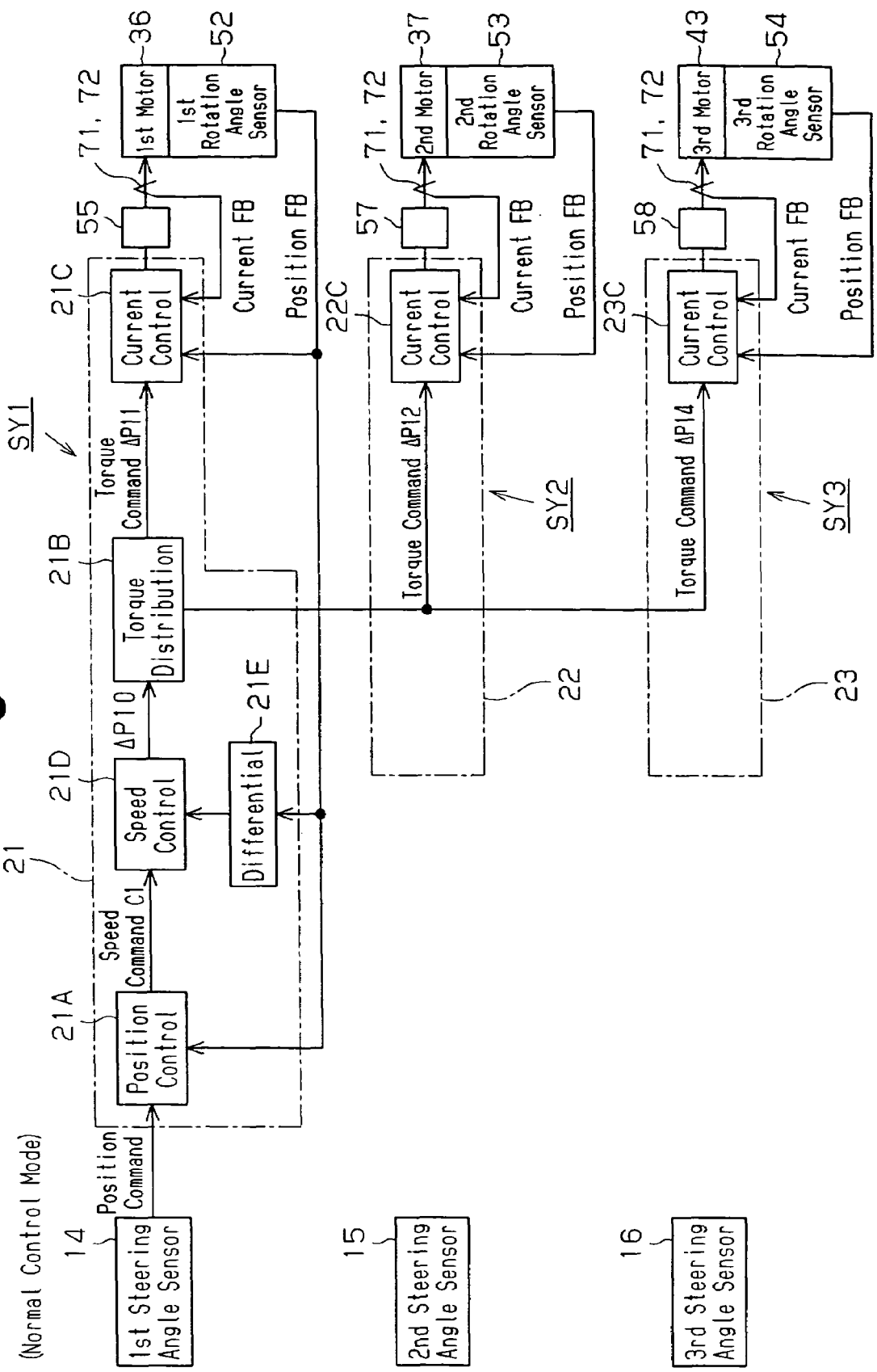
FIG. 14 illustrates the operation of the steering control apparatus of FIG. 12 in the normal control mode.

(1-1) First ECU 21 Operation in the Start Control Mode and Normal Control Mode FIG. 14 shows the controls when all systems are normal.

The operation of the first ECU 21,in the start control mode and the normal control mode has been described in the second embodiment. The torque command $\Delta P10$ in FIG. 14 is equivalent to the first torque command generated based on the speed control process result.

The torque distributor 21B distributes the supplied torque command $\Delta P10$ to the three systems. That is, the torque distributor 21B divides the torque command $\Delta P10$ into a torque command $\Delta P11$ for the first system SY1, a torque command $\Delta P12$ for the second system SY2, and a torque command $\Delta P14$ for the third system SY3, and supplies the three divided torque commands $\Delta P11$, $\Delta P12$, and $\Delta P14$ to the current controllers 21C, 22C, 23C of the associated systems (refer to FIG. 14).

If all systems SY1, SY2, SY3 are normal, the torque distributor 21B uses different distribution ratios when starting the engine and times other than starting the engine.

For example, when starting the engine of the vehicle (start control mode), the distribution ratio is 100/3:0:0 ($\Delta P11$:$\Delta P12$:$\Delta P14$); and at times other than starting the engine of the vehicle (normal control mode), the distribution ratio is 100/3:100/3:100/3 ($\Delta P11$:$\Delta P12$:$\Delta P14$).

The drive control of the first motor 36 executed by the first ECU 21 includes position control for controlling the turning angle in accordance with the steering angle, speed control for controlling the motor speed so as to correspond to the speed command C1, and torque control for obtaining a thrust, i.e., an output torque of the electric motor, required for the position control.

In the current controller 21C, current feedback control is executed such that the difference between the command value (torque command $\Delta P11$) and the feedback value (current value iq and current value id of the first motor 36) is zero. This current control is equivalent to torque control.

(1-2) First Impairment Control Mode

When the first system SY1 is normal and either one of the second and third systems SY2 or SY3 is abnormal, the first ECU 21 enters the first impairment control mode. In this case, the torque distributor 21B of the first ECU 21 distributes a torque command ΔP10 to the two normal systems and excludes the abnormal system.

Figure 15:
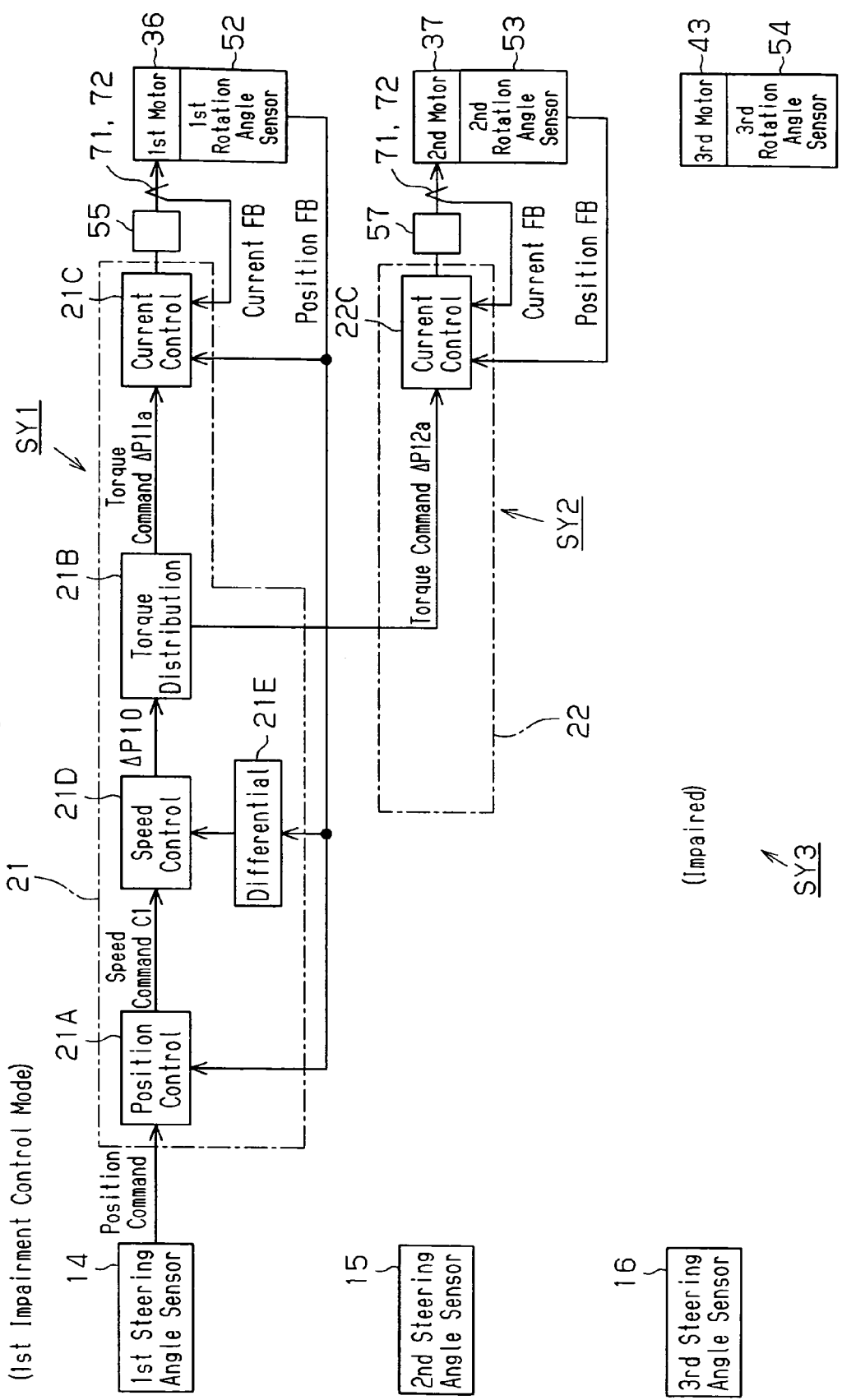
FIG. 15 illustrates the operation of the steering control apparatus of FIG. 12 in a first impairment control mode.

FIG. 15 shows the controls executed when the first and second systems SY1 and SY2 are normal and the third system SY3 is abnormal.

When the second system SY2 is abnormal and the first and third systems SY1 and SY3 are normal, the second system SY2 may be replaced by the third system SY3 in FIG. 15.

When the third system SY3 is abnormal, the third ECU 23 of the third system SY3 stops control of the third motor 43. Then, the torque distributor 21B of the first system SY1 redistributes the torque command ΔP10 to two systems. That is, the torque distributor 21B divides the torque command ΔP10 into a divided torque command ΔP11a for the first system SY1 and a divided torque command ΔP12a for the second system SY2, and respectively provides the two divided torque commands ΔP11a and ΔP12a to the current controller 21C of the first system SY1 and the current controller 22C of the second system SY2. The distribution ratio at this time is 50:50 (ΔP11a:ΔP12a).

In the first impairment mode, the PI controller 64 and the PI controller 65 of the current controllers of each normal system are set so as to have a different current loop gain from one in the normal control mode when all systems are normal. The current loop gain is the integral gain and proportional gain in the PI controller 64 and PI controller 65. These gains in the impairment control mode are set so as to be greater than these gains in the normal control mode.

Since the current loop gain in the first impairment control mode is set so as to be greater than the current loop gain in the normal control mode, there is no decrease in the responsiveness of the motor relative to the operation of the steering wheel 10, and there is no reduction in follow-up of the operation of the steering wheel 10.

The torque command ΔP10 is described below.

When the vehicle is moving and the road surface reaction is comparatively small, a torque command ΔP10 (i.e., the sum of ΔP11a, ΔP12a) is generated such that the angle of the steered wheels T, which is turned by the torque obtained by driving only the first and second motors 36 and 37 in accordance with the divided torque commands ΔP11a and ΔP12a, is identical to the angle of the steered wheels T turned by the torque obtained by driving the three motors 36, 37, and 43 when all systems are normal.

When the vehicle is stopped, a torque command ΔP10 is generated such that the torque generated by the first and second motors 36 and 37 in accordance with the torque commands ΔP11a and ΔP12a turns the steered wheels T to an angle less than the turning angle corresponding to that when all systems SY1, SY2, SY3 are normal.

In the present embodiment, the torque command ΔP10 is a value identical to the total value of the torque commands ΔP11 and ΔP12 in the normal control mode (refer to FIG. 14).

2. Second ECU 22 and Third ECU 23

The second ECU 22 and the third ECU 23 are described below.

(2-1) First ECU 21 Operation in Start Control Mode and Normal Control Mode

When the first ECU 21 is in the normal control mode, the current controller 22C of the second ECU 22 and the current controller 23C of the third ECU 23 receive distributed torque commands ΔP12 and ΔP14, as shown in FIG. 14.

The operation of the current controllers 22C and 23C in the normal control mode has been described in terms of the current controller 21C of FIG. 6.

The current controller 22C executes current feedback control such that the difference between the command value (torque command ΔP12) and the feedback value (current value iq and current value id of the second motor 37) is zero.

The current controller 23C executes current feedback control such that the difference between the command value (torque command ΔP14) and the feedback value (current value iq and current value id of the third motor 43) is zero. The current control of the current controllers 21C, 22C, and 23C are equivalent to torque control.

(2-2) Second Impairment Mode

Control when the first system SY1 is impaired is described below.

When the first system SY1 is impaired and the second system SY2 is normal, the second ECU 22 of the second system SY2 functions as a high order controller than the third ECU 23 of the third system SY3. In other words, the second ECU 22 functions as a master controller, and the third ECU 23 functions as a slave controller.

When the first system SY1 and the second system SY2 are abnormal and the third system SY3 is normal, the third ECU 23 of the third system SY1 functions as the controller for the steering control apparatus 1.

Figure 16:
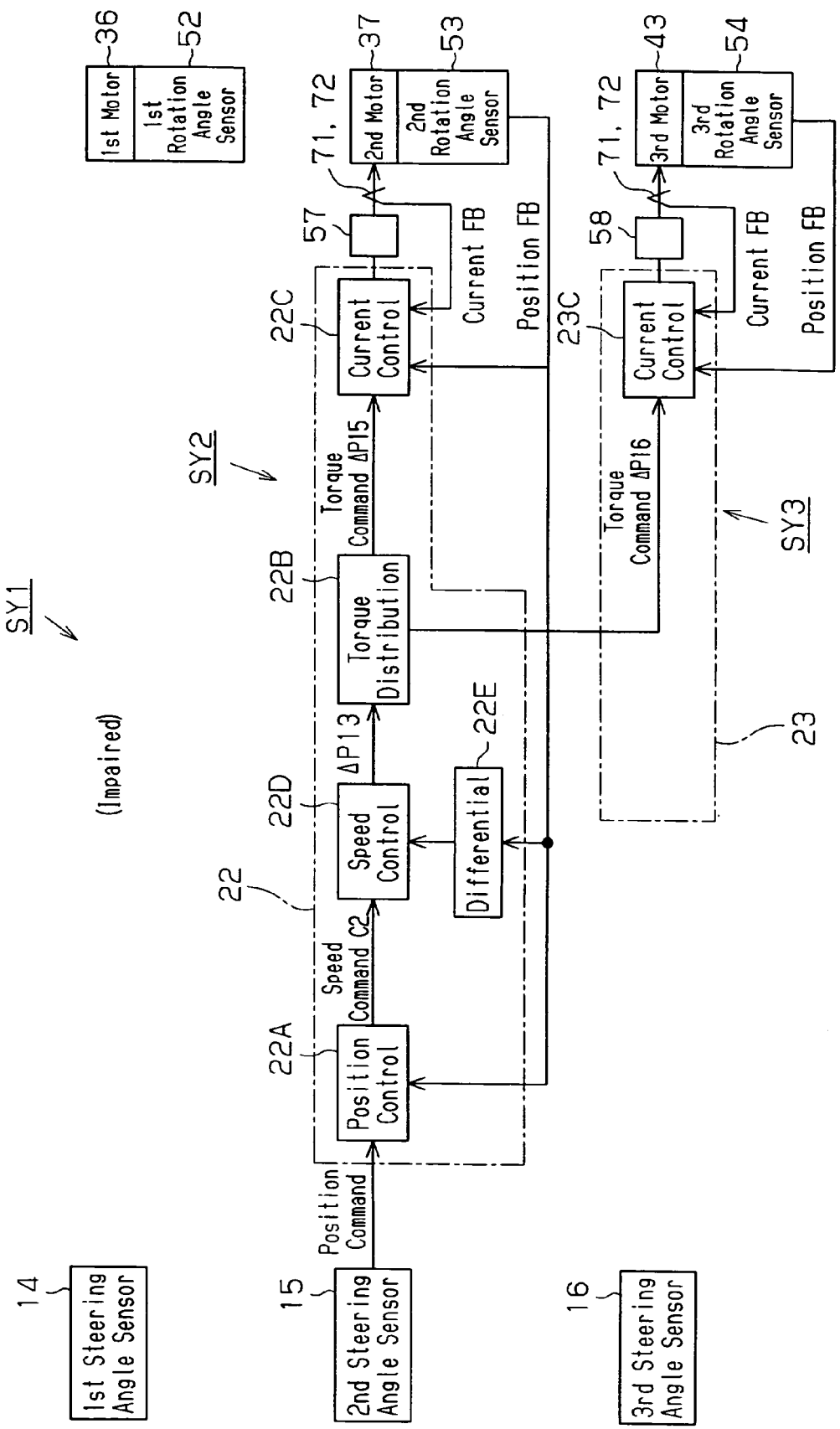
FIG. 16 illustrates the operation of the steering control apparatus of FIG. 12 in a second impairment control mode.
Figure 17:
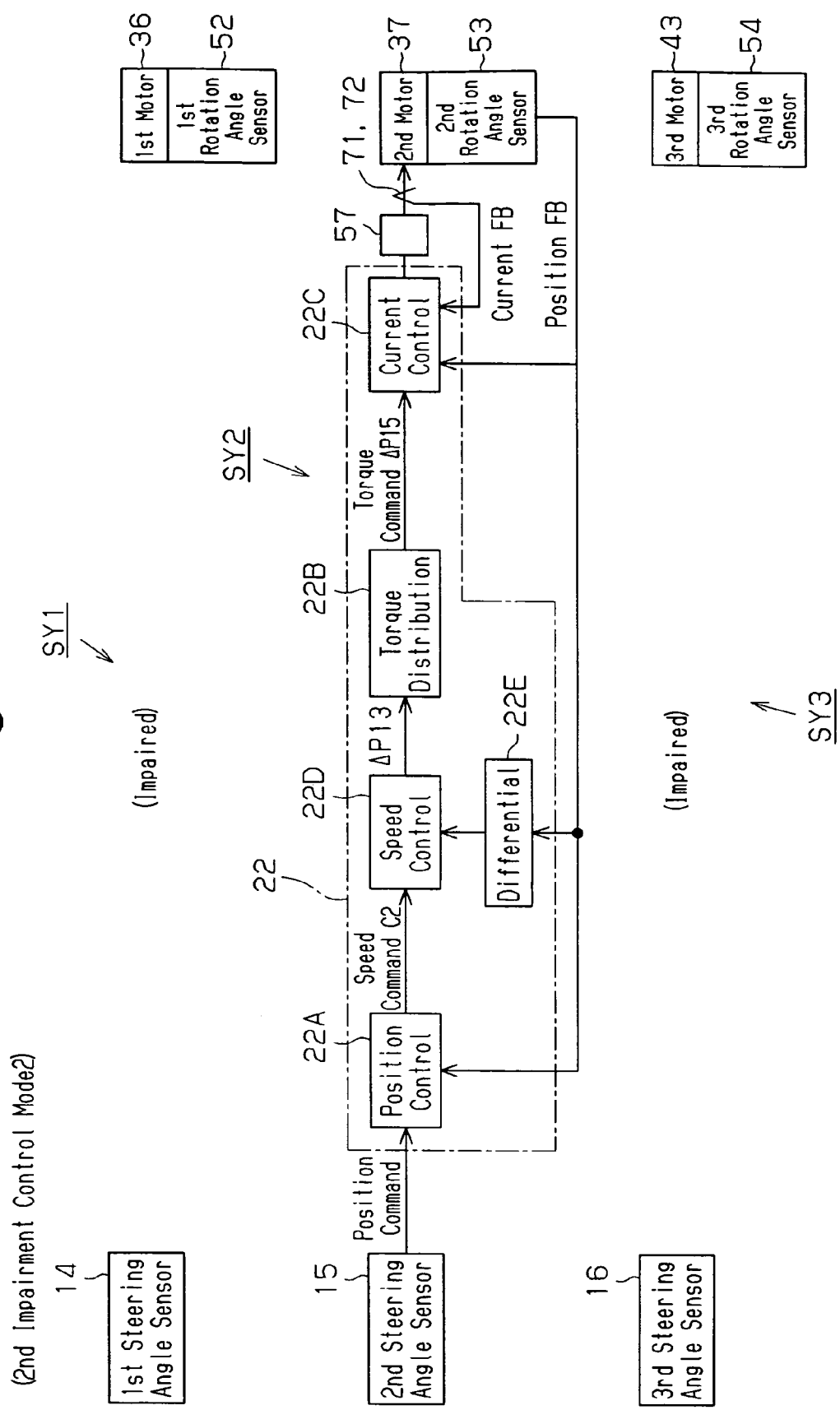
FIG. 17 illustrates the operation of the steering control apparatus of FIG. 12 in a second impairment control mode.

The second impairment control mode is executed when only the first system SY1 is impaired (FIG. 16), or when the first system SY1 and either of the other systems SY2 or SY3 is impaired (FIG. 17).

(2-2-1) When only the first system SY1 is impaired

When only the first system SY1 is impaired, the first ECU 21 of the first system SY1 stops controlling the first motor 36, as shown in FIG. 16.

In the second impairment control mode, the second ECU 22 activates the position controller 22A, torque distributor 22B, current controller 22C, speed controller 22D, and differential processor 22E.

In the second impairment control mode, the drive control of the second motor 37 executed by the second ECU 22 includes position control for controlling the turning angle in accordance with the steering angle, speed control for controlling the motor speed so as to correspond to the speed command C2, and torque control for obtaining a thrust, i.e., an output torque of the electric motor, required for the position control.

In the second impairment control mode, the second ECU 22 drives the second motor 37 via the second drive circuit 57 so as to have the turning angle of the steered wheels T match a target turning angle corresponding to the steering angle detected by the second steering angle sensor 15, i.e., to generate the thrust required to obtain a target turning angle.

Specifically, the position controller 22A receives the steering angle (position command) detected by the second steering angle sensor 15 and the detection signal supplied from the second rotation angle sensor 53, and calculates the rotation angle of the motor shaft 39 relative to the stator based on this detection signal. The detection signal of the second rotation angle sensor 53 is equivalent to the position information of the second steering motor 37.

The position controller 22A calculates the difference between the actual rotation angle of the second motor 37 (motor shaft 39) and the target rotation angle of the motor shaft 39 corresponding to the steering angle of the steering wheel 10. The position controller 22A generates a speed command C2 by multiplying this difference by a predetermined gain required for the position control of the steering rod 35, i.e., the turning angle of the steered wheels T, and thereafter supplies this speed command C2 to the speed controller 22D.

The differential processor 22E calculates the motor speed based on the detection signal of the second rotation angle sensor 53, and provides this calculated motor speed to the speed controller 22D.

The speed controller 22D calculates the difference between the speed command C2 and the actual motor speed, and generates a torque command $\Delta$P13 by multiplying this difference by a predetermined gain required for turning speed control of the steered wheels T, and provides this torque command $\Delta$P13 to the torque distributor 22B. That is, the speed controller 22D executes speed control such that the difference between the command value (speed command C2) and the feedback value (motor speed of the second motor 37) is zero. The torque command $\Delta$P13 is equivalent to the second torque command generated based on the speed control process result.

The torque distributor 22B divides the torque command $\Delta$P13 by a ratio corresponding to the number of normal systems, generates divided torque commands $\Delta$P15 and $\Delta$P16, and respectively provides these divided torque commands $\Delta$P15 and $\Delta$P16 to the current controller 22C of the second system SY2 and the current controller 23C of the third system SY3.

Since both system SY2 and system SY3 are normal in the present example, the distribution ratio is 50:50 ($\Delta$P15: $\Delta$P16).

The PI controllers 64 and 65 of the current controllers of each system have different current loop gains in the second impairment control mode than when all systems are normal (normal control mode). The current loop gain is the integral gain and proportional gain in the PI controllers 64 and 65. In the impairment control mode, these gains are preferably greater than the gains in the normal control mode. In this way reduction in the response of the motor relative to the operation of the steering wheel 10 is prevented.

The torque command $\Delta$P13 is described below.

When the vehicle is moving and the road surface reaction is comparatively small, a torque command $\Delta$P13 (i.e., the sum of $\Delta$P15, $\Delta$P16) is generated such that the angle of the steered wheels T, which is turned by the torque obtained by driving only the second and third motors 37 and 43 in accordance with the divided torque commands $\Delta$P15 and $\Delta$P16, is identical to the angle of the steered wheels T turned by the torque obtained by driving the three motors 36, 37, and 43 when all systems are normal.

When the vehicle is stopped, a torque command $\Delta$P13 is generated such that the torque generated by the second and third motors 37 and 43 in accordance with the torque commands $\Delta$P15 and $\Delta$P16 turns the steered wheels T to an angle less than the turning angle corresponding to that when all systems SY1, SY2, SY3 are normal.

In the present embodiment, the torque command $\Delta$P13 is a value identical to the total value of the torque commands $\Delta$P12 and $\Delta$P14 in the normal control mode.

The operation of the current controller 22C in the second impairment control mode is similar to the operation of the current controller 22C in the normal control mode.

The parts of the current controller 22C process the torque command $\Delta$P15, detection signal of the second rotation angle sensor 53, and current detection signals relating to the excitation currents iu and iv supplied from the current sensors 71 and 72, generate a plurality of pulse signals (PWM control signals), and provide these pulse signals to the second drive circuit 57. The second drive circuit 57 generates a plurality of drive voltages in accordance with the pulse signals (PWM control signals), and applies a drive voltage to each phase of the second motor 37.

In this way, in the second impairment control mode, the current controller 22C executes current control such that the difference between the command value (torque command $\Delta$P15) and the feedback value (current value iq and current value id of the second motor 37) is zero. This current control is equivalent to torque control.

When only the first system SY1 is impaired, the current controller 23C in the third ECU 23 is activated. The current controller 23C executes current feedback control such that the difference between the command value (torque command $\Delta$P16) and the feedback value (current value iq and current value id of the third motor 43) is zero. This current control is equivalent to torque control.

(2-2-2) When the First System SY1 and Another System are Impaired

When the first system SY1 and one other system (system SY2 or system SY3) are simultaneously impaired, the first ECU 21 of the first system SY1 stops control of the first motor 36, and the ECU of the other impaired system stops control of the motor of that system.

FIG. 17 shows the control mode when the first system SY1 and the third system SY3 are impaired and the second system SY2 is normal.

The control mode when the first system SY1 and the second system SY2 are impaired and the third system SY3 is normal can be understood by exchanging the second system SY2 for the third system SY3 in the example of FIG. 17.

In the second ECU 22, the position controller 22A, torque distributor 22B, the current controller 22C, the speed controller 22D, and the differential processor 22E are activated.

The structure of each of these parts is identical to the structure shown in FIG. 16, although the distribution ratio of the torque distributor 22B is different. That is, in this example, the distribution ratio is 100:0 ($\Delta$P15:$\Delta$P16). Accordingly, the torque command $\Delta$P15 provided from the torque distributor 22B to the current controller 22C is identical to the torque command $\Delta$P13 provided from the speed controller 22D to the torque distributor 22B. Furthermore, although not shown in the drawing, even though the torque distributor 22B outputs the torque command $\Delta$P16 to the third ECU 23, the torque command $\Delta$P16 is zero.

The operation of the steering control apparatus 1 of the third embodiment is described below.

Figure 13:
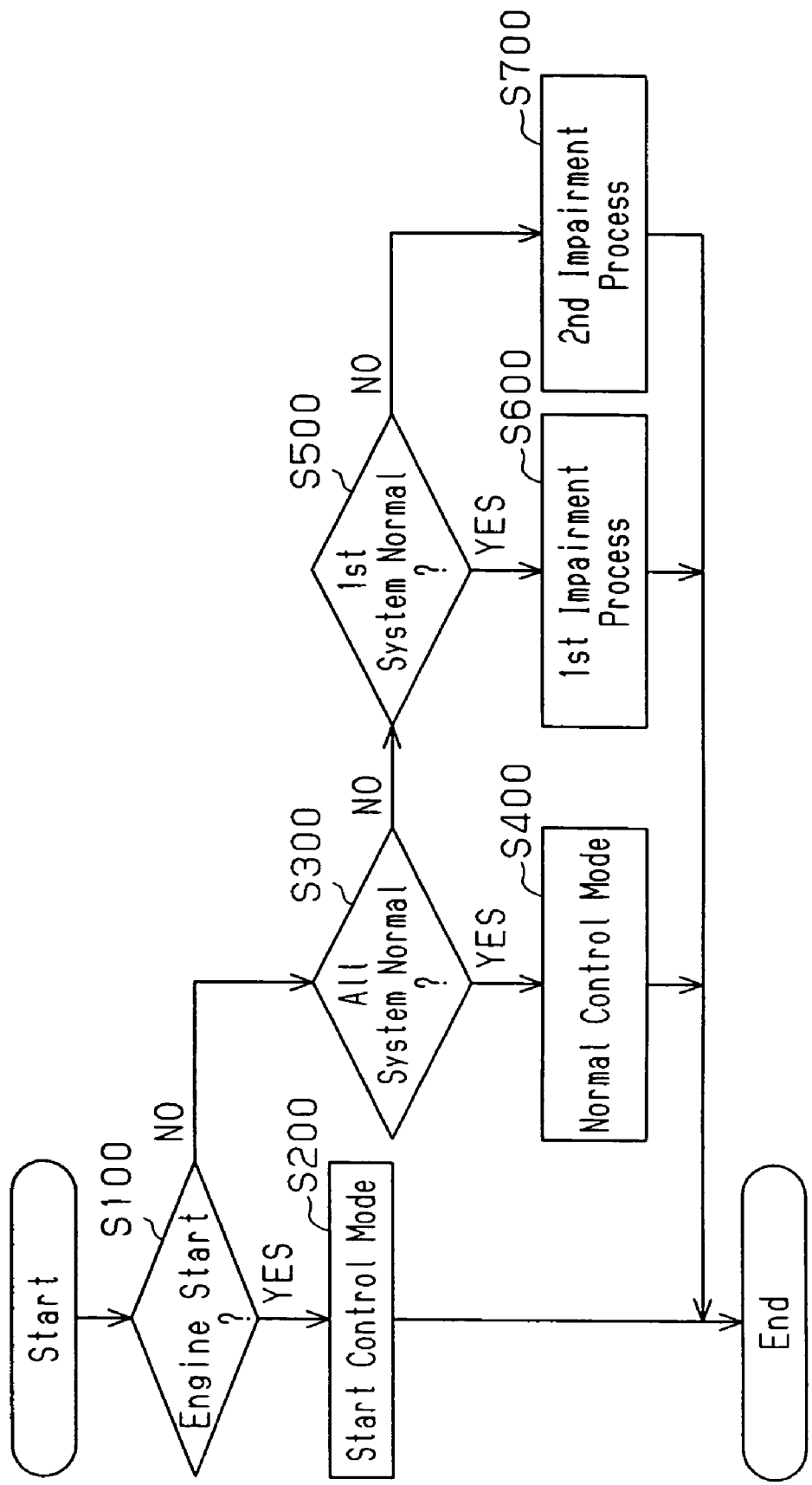
FIG. 13 is a flow chart of the controls executed by a first ECU of FIG. 12.

FIG. 13 is a flow chart of the control program executed by the first ECU 21 at predetermined intervals.

In step S100, the first ECU 21 checks whether or not it is engine starting time, or whether the engine has been started. When it is the engine starting time (step S100: YES), the first ECU 21 executes the process of the start control mode in step S200.

Accordingly, the first ECU 21 is in the start control mode from the time the first ECU 21 receives an ON signal from the ignition switch until a predetermined time elapses. The second ECU 22 of the second system SY2 and the third ECU 23 of the third system SY3 enter the start control mode in response to the torque command $\Delta$P12 and $\Delta$P14 supplied from the first ECU 21.

When a predetermined time elapses from when an ON signal is received (step S100: NO), the first ECU 21 determines whether or not all systems are normal based on error information supplied from the other systems SY2 and SY3.

When all systems are normal (step S300:YES), the first ECU 21 enters the normal control mode in step S400. In step S400, all motors 36, 37, and 43 are simultaneously driven in accordance with the torque command ΔP11, torque command ΔP12, and torque command ΔP14 distributed to each system.

When all systems are not normal, or when at least one system is abnormal in step S300 (step S300: NO), then, in step S500, the first ECU 21 identifies which system has the abnormality based on the error information received from the other systems.

When the first system SY1 is normal (step S500: YES), then in step S600, the first ECU 21 executes a first failure process. In this case, the torque distributor 21B of the first ECU 21 distributes the torque command ΔP10 to the normal systems and excludes the impaired system. This time the ECU of the abnormal system stops control of the associated motor.

When the first system SY1 is abnormal (step S500: NO), then in step S700, the first ECU 21 executes the second impairment process. In this case, the first ECU 21 stops control of the first motor 36, as shown in FIG. 16.

When only the first system SY1 is impaired, the second ECU 22 of the second system SY2 functions as a higher order controller than the third ECU 23 of the third system SY3, and executes the process described in section 2-2-1.

When the first system SY1 and other system are impaired, the ECU of the normal system executes the process described in section 2-2-2.

The third embodiment of the present invention provides the following advantages.

(1) The steering control apparatus 1 of the third embodiment is provided with a plurality of systems SY1, SY2, and SY3, which include three motors 36, 37, and 43 having essentially identical performance and arranged on the same axis, and three control means 21, 22, and 23 for respectively controlling the three motors. The three control means 21, 22, and 23 simultaneously drive the associated motors 36, 37, and 43 to drive a common steering rod 35. Furthermore, the first ECU 21 of the first system SY1 generates a torque command ΔP10 (first torque command) for driving the steered wheel drive mechanism 200 based on the operating position of the steering wheel 10 and the position information of the associated first motor 36, and distributes this torque command ΔP10 in accordance with the number of systems. The first ECU 21 executes torque control for the first motor 36 in accordance with the torque command ΔP11 distributed to the first system Sy1. In the other systems, i.e., systems SY2 and SY3, the second ECU 22 and the third ECU 23 executes torque control for the associated motors 37 and 43 in accordance with the torque commands ΔP12 and ΔP14 distributed to the associated system.

In this way, one system manages the high order control loop (position control and speed control), calculates the torque required for steering control, and distributes the calculated torque to the total number of normal systems (three). Each system executes a low order control loop (torque control). Since the position control of the steered wheels T (steering rod 35 or electric motor) is performed by the first system SY1 alone, even when all motors 36, 37, and 43 are driven simultaneously, there is no torque interference between the motors 36, 37, and 43, there is no reduction in torque caused by torque interference, and there is no reduction in responsiveness or follow-up relative to the operation of the steering wheel 10. Since there is no torque interference, noise, vibration, and heat are not generated.

(2) The first ECU 21, second ECU 22, and third ECU 23 respectively detect impairment of the systems other than their own system. When one or more systems, including the first system which generates the torque command ΔP10, is impaired, one of the ECUs of another normal system generates a torque command ΔP13 (second torque command) based on position information of the motor of its own system and the operating position of the steering wheel 10, and distributes the torque command ΔP13 (second torque command) in accordance with the number of remaining normal systems. In each system, torque control is executed for the associated motor in accordance with the torque commands ΔP15 and ΔP16 distributed to each system.

Accordingly, even when the first system SY1 is impaired, the steering of the steered wheels T can be backed up by another normal system such as the second system SY2.

In this way, when the system (SY1) which manages the high order control loop (position control and speed control) is included in the systems which are impaired, one of the other normal systems (SY2, SY3) freshly manages the high order control loop so as to again distribute the calculated total required torque in accordance with the number of normal systems. Since the plurality of motors 36, 37, and 43 have identical performance, there is no restriction on the distribution of torque when one system is impaired, torque control is made easier, and there is no reduction in responsiveness of the motor relative to the steering wheel 10 even when an impairment occurs in the steering control apparatus 1.

(3) The steering control apparatus 1 of the third embodiment includes the ECUs 21, 22, and 23, each of which functions as impairment detecting means for detecting impairment of systems other than its own system. When one or more systems are impaired excluding the first system SY1 which generated the torque command ΔP10, the first ECU 21 of the first system SY1 distributes the torque command ΔP10 to the number of remaining normal systems. The first ECU 21 and the ECU 22 of the other normal system (second system SY2 in the example of FIG. 15) execute torque control for the associated motors 36 and 37 in accordance with the respective torque commands ΔP11*a* and ΔP12*a* distributed to the associated system.

Accordingly when a system other than the first system SY1 is impaired, the steering of the steered wheels T can be backed up by the first ECU 21 distributing the torque command ΔP10 (first torque command) to the number of remaining normal systems.

In this way, when the system that managed the high order control loop (position control and speed control) is not included in the impaired systems, the system that managed the high order control loop prior to the impairment manages the high order control loop after impairment, and distributes the torque command ΔP10 to the number of remaining normal systems. Since the plurality of motors have identical performance, distribution of the torque command ΔP10 is easy, and there is no reduction in responsiveness of the motor relative to the operation of the steering wheel 10 even when an impairment occurs in the steering control apparatus 1.

(4) In the torque control of the third embodiment, there is feedback of the current of the electric motors. When all systems are normal and when one or more systems are impaired, the first ECU 21 through the third ECU 23 change the current loop gain of the current control. Therefore, reduction in responsiveness relative to the operation of the steering wheel 10 is suppressed even when one or more systems are damaged.

It should be apparent to those skilled in the art that the present invention may be embodied in many other specific forms without departing from the spirit or scope of the invention. Particularly, it should be understood that the present invention may be embodied in the following forms.

(1) The number of systems is not limited to two or three, and may be four or more.

In this case, one system manages a high order control loop for position control and current control, and the other systems execute a low order control loop for current control. When one system is abnormal, one of the remaining systems executes position control and current control, and the other systems execute current control.

When there are four or more systems and all systems are normal, one system manages a high order control loop for position control, speed control, and current control, and the other systems execute a low order control loop for current control. When one system is abnormal, one of the remaining systems executes position control, speed control, and current control, and the other systems executed current control. That is, when the systems are normal, the steering rod 35 is drive by the synthesized output of all motors, and when one system is abnormal, the steering rod 35 is driven by the synthesized output of the remaining motors.

(2) The rotation angle sensor may be a rotation displacement sensor such as a resolver or the like instead of a rotary encoder.

(3) The present invention is not limited to a steer-by-wire type steering control apparatus 1, and may be applied to motor-driven power assisted steering control apparatuses. In this case, the steering rod 35 is changed to a rack shaft, a pinion gear is connected to the steering shaft 11, and the rack shaft and steering shaft are coupled by a rack and pinion mechanism.

When all systems (SY2), other than the system (SY1) associated with the ECU (21) that distributes the torque command, are impaired, the phrase "torque command distribution" includes supplying a torque command to only the system (SY1) associated with that ECU.

The present examples and embodiments are to be considered as illustrative and not restrictive, and the invention is not to be limited to the details given herein, but may be modified within the scope and equivalence of the appended claims.

What is claimed is:

1. A steering control apparatus comprising:
   a steered wheel drive mechanism including a plurality of motors for driving a steered wheel, wherein the plurality of motors are arranged coaxially, have substantially the same performance, and are driven simultaneously;
   a plurality of control means, each controlling an associated one of the motors; and
   a plurality of systems comprised by the plurality of motors and the plurality of control means,
   wherein the control means of one of the systems comprises means for generating a first torque command representing torque for turning the steered wheel based on the steering position of a steering wheel and position information of the motor associated with the one of the systems; means for distributing the first torque command to the plurality of systems as one or more divided torque commands; and means for controlling the torque of one of the motors associated with said one of the systems in accordance with the distributed torque command distributed to the one of the systems; and
   wherein the control means of at least a further one of the systems comprises means for controlling the torque of a further one of the motors associated with said further one of the systems in accordance with the distributed torque command distributed to the further one of the systems.

2. The apparatus according to claim 1, wherein each of the systems further includes an impairment detecting means for detecting impairment of the system, wherein when one or more of the systems, including said one of the systems generating the first torque command, is impaired, the control means of one of the systems that is functioning normally:
   generates a second torque command representing torque for driving the steered wheel based on a steering position of the steering wheel and position information of the associated one of the motors;
   generates one or more distributed torque commands from the second torque command in accordance with the number of the systems that are functioning normally, each of the distributed torque commands generated from the second torque command being distributed to an associated one of the systems that is functioning normally; and
   controls the torque of the associated one of the motors in accordance with the distributed torque command distributed to said one of the systems that is functioning normally; and
   wherein the control means of at least a further one of the other systems that is functioning normally controls the torque of the associated one of the motors in accordance with the distributed torque command distributed to the at least the further one of the systems functioning normally.

3. The apparatus according to claim 1, wherein each of the systems further includes an impairment detecting means for detecting impairment of the system, wherein when one or more of the systems, excluding said one of the systems generating the first torque command, is impaired, the control means of said one of the systems:
   generates the one or more distributed torque commands from the first torque command in accordance with the number of systems that are functioning normally, each of the one or more distributed torque commands being provided to an associated one of the systems that is functioning normally;
   controls the torque of the associated one of the motors in accordance with the distributed torque command distributed to said one of the systems;
   and the control means of at least a further one of the systems that is functioning normally controls the torque of the associated one of the motors in accordance with the distributed torque command distributed to said at least a further one of the systems functioning normally.

4. The apparatus according to claim 2, wherein controlling the torque of the associated one of the motors includes feedback controlling of excitation current of said associated one of the motors, each of the control means having different current loop gains for the feedback controlling when all of the systems are functioning normally as compared to when one or more of the systems is impaired.

5. The apparatus according to claim 3, wherein controlling the torque of the associated one of the motors includes feedback controlling of excitation current of said associated one of the motors, each of the control means having different current loop gains for the feedback controlling when all of the systems are functioning normally as compared to when one or more of the systems is impaired.

6. A steering control apparatus for a vehicle having a steering wheel and a steered wheel, the apparatus comprising:

a plurality of motors for turning the steered wheel, the plurality of motors having substantially the same performance;

a plurality of control units capable of mutual communication, each of the control units controlling an associated one of the motors, the control units and the motors forming a plurality of systems, wherein each control unit executes mutual communication and determines whether the corresponding system is normal or impaired; and a steering sensor for detecting the operating angle of the steering wheel;

wherein, when each of the systems is operating normally, one of the control units: generates a torque command representing torque required to turn the steered wheel in accordance with the operating angle detected by the steering sensor; distributes the torque command to the plurality of systems as a plurality of distributed torque commands; and wherein each of the control units controls the associated motor in accordance with the associated distributed torque command.

7. The apparatus according to claim 6, wherein, when each of the systems is operating normally, said one of the control units generates the distributed torque commands, the number of which is equal to the number of systems, and the motors are driven with mutually equal torques in accordance with the distributed torque commands.

8. The apparatus according to claim 6, wherein the plurality of motors includes at least a first motor and a second motor, the plurality of control units includes at least a first control unit for controlling the first motor and a second control unit for controlling the second motor, and the plurality of systems includes at least a first system containing the first motor and the first control unit and a second system containing the second motor and the second control unit, said one control unit being the first control unit; wherein, when one or more systems, including the first system, is impaired, and one or more systems, including the second system, is operating normally:

the first control unit stops generating and providing the torque command and the distributed torque commands in addition to stopping the first motor;

wherein the second control unit:

generates the torque command representing torque required to turn the steered wheel in accordance with the operating angle detected by the steering sensor;

divides the torque command into a number equal to the number of said one or more normal systems to generate one or more of the distributed torque commands; and provides the one or more distributed torque commands to said one or more normal systems; and wherein each of the control units corresponding to said one or more normally operating systems drives the associated motor in accordance with the associated distributed torque command.

9. The apparatus according to claim 8, wherein when second system alone is said one or more normally operating systems, the torque command and the distributed torque command are the same.

10. The apparatus according to claim 8, wherein said steering sensor is one of a plurality of steering sensors, each connected to an associated one of the control units, said steering sensor being connected to the second control unit.

11. The apparatus according to claim 6, wherein the plurality of motors includes at least a first motor and a second motor, the plurality of control units includes at least a first control unit for controlling the first motor and a second control unit for controlling the second motor, and the plurality of systems includes at least a first system containing the first motor and the first control unit and a second system containing the second motor and the second control unit, with said one control unit being the first control unit; and when one or more systems, including the first system, is operating normally, and one or more systems, including the second system, is impaired, the first control unit generates:

a torque command representing a torque required to turn the steered wheel in accordance with the operating angle detected by the steering sensor; and divides the torque command into a number equal to the number of said one or more normally operating systems to generate one or more of the distributed torque commands; and provides the one or more distributed torque commands to said one or more normally operating systems;

wherein each of the control units corresponding to said one or more normally operating systems drives the associated motor in accordance with the associated distributed torque command.

12. The apparatus according to claim 11, wherein when the first system alone is said one or more normally operating systems, the torque command and the distributed torque command are the same.

13. The apparatus according to claim 11, wherein said steering sensor is one of a plurality of steering sensors, each connected to an associated one of the control units, said steering sensor being connected to the first control unit.

14. A steering control method for a vehicle having a steering wheel, a steered wheel, and a plurality of motors having substantially the same performance for turning the steered wheel, the method comprising:

detecting the operating angle of the steering wheel;

generating a torque command representing torque required for turning the steered wheel in accordance with the operating angle;

dividing the torque command to generate a plurality of distributed torque commands, each associated with one of the motors; and controlling the motors in accordance with the distributed torque commands.

15. A steering control method for a vehicle having a steering wheel, a steered wheel, a plurality of motors mutually having substantially the same performance for turning the steered wheel, and a plurality of control units, each controlling an associated one of the motors, the motors and the control units forming a plurality of systems, wherein the systems include a first system containing a first motor and a first control unit for controlling the first motor and a second system containing a second motor and a second control unit for controlling the second motor, the method comprising:

checking whether or not the systems are operating normally;

detecting an operating angle of the steering wheel;

driving the motors in accordance with the operating angle, said driving including when the systems are operating normally:

generating a torque command representing torque required with the first control unit to turn the steered wheel in accordance with the operating angle;

dividing the torque command with the first control unit to generate a plurality of distributed torque commands, each corresponding to an associated one of the motors; and controlling the motors with the first control unit in accordance with the distributed torque commands;

wherein when one or more of the systems including the first system are operating normally and one or more systems including the second system are impaired:

stopping the motor associated with each control unit corresponding to said one or more impaired systems;

generating the torque command representing torque required to turn the steered wheel with the first control unit in accordance with the detected operating angle;

dividing the torque command into a number equal to the number of the systems that are normal with the first control unit to generate one or more distributed torque commands;

providing the one or more distributed torque commands to an associated one of each of the one or more normal systems with the first control unit; and driving the associated motor in accordance with the associated distributed torque command with each of the control units corresponding to the at least one normally operating system; and when one or more of the systems including the first system are impaired and one or more of the systems including the second system are operating normally:

stopping the motor associated with each control unit corresponding to said one or more impaired systems;

generating the torque command representing torque required to turn the steered wheel with the second control unit in accordance with the detected operating angle;

dividing the torque command into a number equal to the number of the systems that are normal with the second control unit to generate one or more distributed torque commands;

providing the one or more distributed torque commands to an associated one of each of the one or more normal systems with the second control unit; and driving the associated motor in accordance with the associated distributed torque command with each of the control units corresponding to the at least one normally operating system.

* * * * *